(12) United States Patent
Tanase et al.

(10) Patent No.: US 8,498,013 B2
(45) Date of Patent: Jul. 30, 2013

(54) FLUID EJECTION DEVICE, PROGRAM, AND FLUID EJECTION METHOD

(75) Inventors: Kazuyoshi Tanase, Nagano (JP); Toru Takahashi, Nagano (JP); Takamitsu Kondo, Nagano (JP); Hiroshi Wada, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 313 days.

(21) Appl. No.: 13/092,458

(22) Filed: Apr. 22, 2011

(65) Prior Publication Data

US 2011/0273729 A1    Nov. 10, 2011

(30) Foreign Application Priority Data

May 7, 2010   (JP) ................. 2010-107005

(51) Int. Cl.
*G06K 15/10*   (2006.01)
(52) U.S. Cl.
USPC .............. 358/1.8; 358/3.3; 358/3.13

(58) Field of Classification Search
USPC ................... 358/1.1, 1.8, 3.13, 3.3
See application file for complete search history.

(56) References Cited

FOREIGN PATENT DOCUMENTS

| JP | 06-255175 A | 9/1994 |
|---|---|---|
| JP | 2010-099893 A | 5/2010 |
| JP | 2010-105289 A | 5/2010 |

*Primary Examiner* — King Poon
*Assistant Examiner* — Iriana Cruz
(74) *Attorney, Agent, or Firm* — Global IP Counselors, LLP

(57) ABSTRACT

A fluid ejection device includes first, second and third nozzle rows for forming first, second and third band images, respectively. The fluid ejection device forms an image in which an edge portion at one side in a prescribed direction in the first band image overlaps an edge portion at the other side in the second band image, and an edge portion at one side in the second band image overlaps an edge portion at the other side in the third band image. The fluid ejection device carries out a halftoning process whereby a center area of a dither mask equal in size to the input data for forming a band image but having a smaller dot generation rate in the edge areas than in the center area is associated with the input data for forming the edge portion to the other side of the first band image.

10 Claims, 11 Drawing Sheets

Fig. 3A
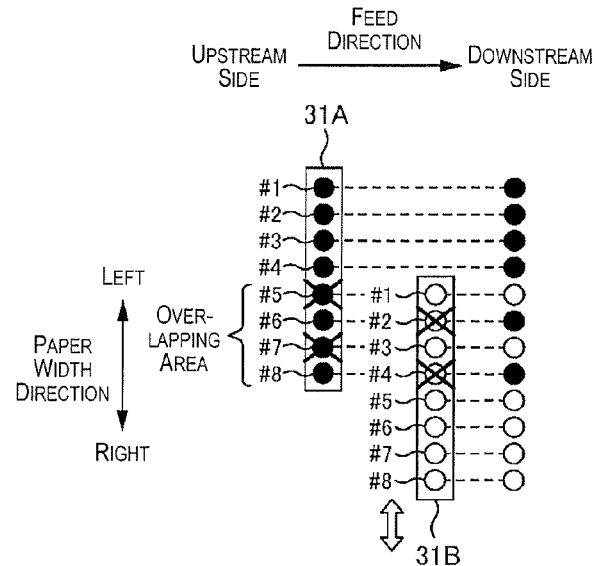
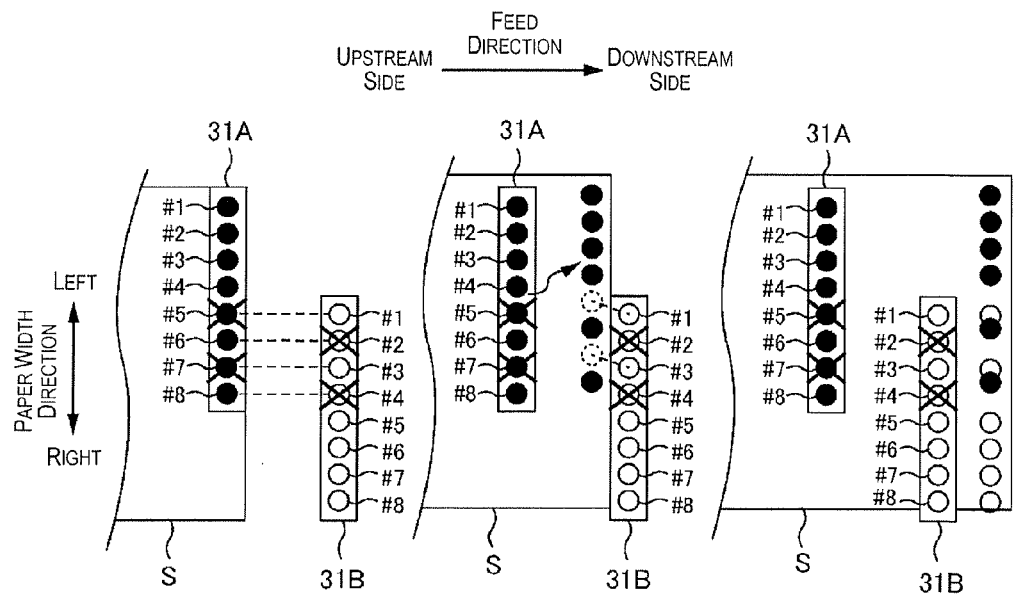
Fig. 3B

FLUID EJECTION DEVICE, PROGRAM, AND FLUID EJECTION METHOD

CROSS-REFERENCE TO RELATED APPLICATIONS

This application claims priority to Japanese Patent Application No. 2010-107005 filed on May 7, 2010. The entire disclosure of Japanese Patent Application No. 2010-107005 is hereby incorporated herein by reference.

BACKGROUND

1. Technical Field

The present invention relates to a fluid ejection device, a program, and a fluid ejection method.

2. Related Art

An example of a fluid ejection device is an inkjet printer (hereinafter referred to as "printer") that employs a head having nozzle rows of nozzles for ejecting ink arranged in a prescribed direction, to form images. Among printers, there are certain printers that, for example, have a plurality of heads arranged in the nozzle row direction, and that form an image as a medium is advanced below the plurality of heads in a direction intersecting the nozzle row direction.

However, the nozzle spacing of the nozzle rows is extremely small, and if there is deviation in position of a head in the nozzle row direction, darker or lighter density may appear in image areas that are formed at interstices between heads. Accordingly, there has been proposed a printer having a plurality of heads that are positioned with the ends of the heads overlapping (see, Japanese Laid-Open Patent Publication No. 6-255175).

SUMMARY

According to the printer mentioned above, an image composed of a plurality of band images formed by the heads and arranged in the nozzle row direction is printed while the edges of the band images overlap. During creation of dot data in relation to this image, a halftoning process is carried out using a dither mask equivalent in size in the nozzle row direction to the band images, and having a lower dot generation rate in the edges than in the center.

However, if the edge portions of the image are printed using the edge nozzles of the heads, and, moreover, if the dither mask described above is associated in unmodified form with high-level tone data for the purpose of forming the band images situated at the edges, the edge portions of the image will be printed based on dot data having a low dot generation rate. As a result, both edge portions of the image may become lighter, and the image quality of the printed image may be degraded.

It is accordingly an object of the present invention to minimize such degradation of image quality.

A fluid ejection device according to one aspect of the present invention includes first, second third nozzle rows, a storage portion and a control portion. The first nozzle row have nozzles configured and arranged to eject a fluid onto a medium with the nozzles being arranged in a prescribed direction, the first nozzle row being configured to form a first band image while facing a first location on the medium. The second nozzle row have nozzles configured and arranged to eject a fluid onto the medium with the nozzles being arranged in the prescribed direction, the second nozzle row being configured to form a second band image while facing a second location on the medium. The third nozzle row have nozzles configured and arranged to ejecting a fluid onto the medium, the nozzles being arranged in the prescribed direction, and the third nozzle row being configured to form a third band image while facing a third location on the medium. The storage portion is configured to store a dither mask used in a halftoning process for converting input data composed of a plurality of arranged pixels into dot data representing dot on/off states, the dither mask having edge areas that are areas at both edge portions in the prescribed direction and a center area that is an area at a center portion in the prescribed direction, and having a plurality of arranged threshold values. The control portion is configured to form, based on the dot data, an image in which an edge portion lying to one side in the prescribed direction in the first band image overlaps an edge portion lying to the other side in the prescribed direction in the second band image, and an edge portion lying to one side in the prescribed direction in the second band image overlaps an edge portion lying to the other side in the prescribed direction in the third band image. The control portion is configured to associate the dither mask stored in the storage portion with the input data for forming the second band image, and to carry out the halftoning process with the dither mask in which a number of the threshold values arranged in the prescribed direction is equal to a number of the pixels arranged in the prescribed direction in the input data for forming the second band image with a dot generation rate in the edge areas being lower than a dot generation rate in the center area. The control portion is configured to carry out the halftoning process upon the center area and the edge area lying to the one side in the prescribed direction in the dither mask being associated with the input data for forming the center portion and the edge portion lying to the one side in the prescribed direction in the first band image, and upon the center area in the dither mask being associated with the input data for forming the edge portion lying to the other side in the prescribed direction in the first band image.

These and other features of the present invention will be apparent from the following description and accompanying drawings.

BRIEF DESCRIPTION OF THE DRAWINGS

Referring now to the attached drawings which form a part of this original disclosure:

FIG. 3A is a drawing showing formation of a dot row along the paper width direction, and FIG. 3B is a drawing depicting dot formation when the paper travels along a skewed path.

DETAILED DESCRIPTION OF EXEMPLARY EMBODIMENTS

Figure 1A:
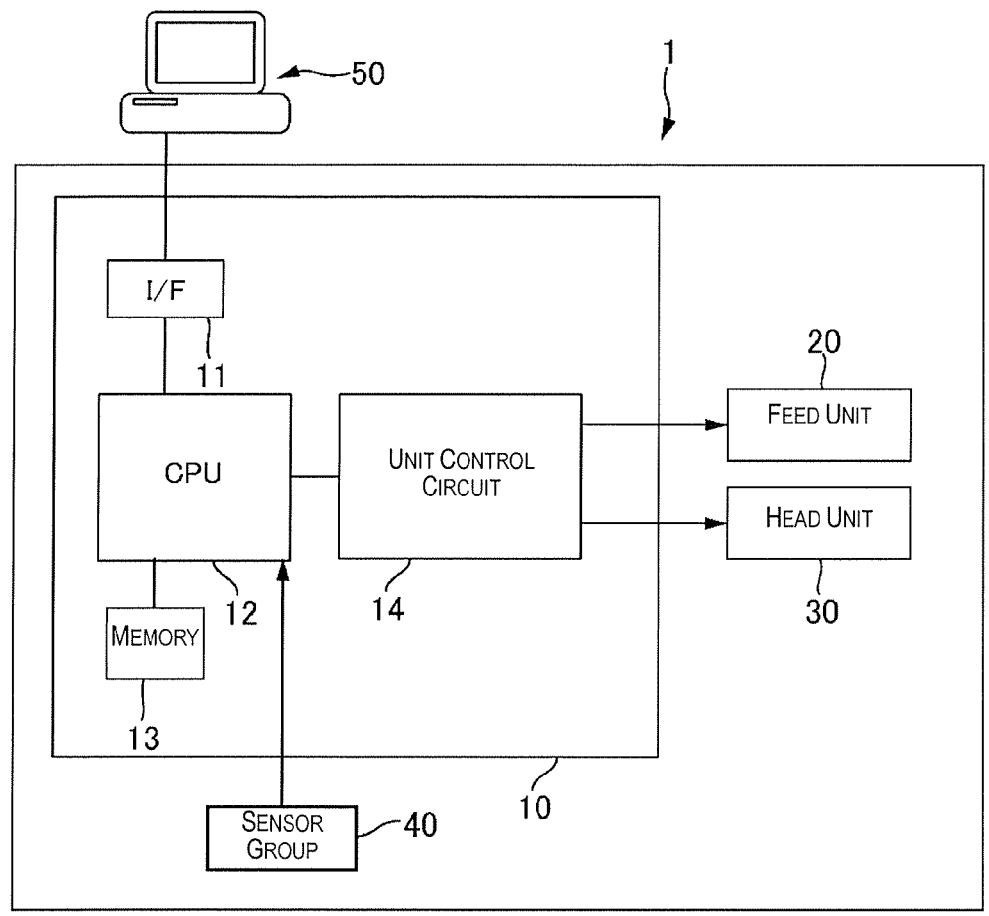
FIG. 1A is an overall configuration block diagram of a printer.

At least the following aspects of the invention will be apparent from the disclosure of the specification and the accompanying drawings.

A fluid ejection device includes first, second third nozzle rows, a storage portion and a control portion. The first nozzle row have nozzles configured and arranged to eject a fluid onto a medium with the nozzles being arranged in a prescribed direction, the first nozzle row being configured to form a first band image while facing a first location on the medium. The second nozzle row have nozzles configured and arranged to eject a fluid onto the medium with the nozzles being arranged in the prescribed direction, the second nozzle row being configured to form a second band image while facing a second location on the medium. The third nozzle row have nozzles configured and arranged to ejecting a fluid onto the medium, the nozzles being arranged in the prescribed direction, and the third nozzle row being configured to form a third band image while facing a third location on the medium. The storage portion is configured to store a dither mask used in a halftoning process for converting input data composed of a plurality of arranged pixels into dot data representing dot on/off states, the dither mask having edge areas that are areas at both edge portions in the prescribed direction and a center area that is an area at a center portion in the prescribed direction, and having a plurality of arranged threshold values. The control portion is configured to form, based on the dot data, an image in which an edge portion lying to one side in the prescribed direction in the first band image overlaps an edge portion lying to the other side in the prescribed direction in the second band image, and an edge portion lying to one side in the prescribed direction in the second band image overlaps an edge portion lying to the other side in the prescribed direction in the third band image. The control portion is configured to associate the dither mask stored in the storage portion with the input data for forming the second band image, and to carry out the halftoning process with the dither mask in which a number of the threshold values arranged in the prescribed direction is equal to a number of the pixels arranged in the prescribed direction in the input data for forming the second band image with a dot generation rate in the edge areas being lower than a dot generation rate in the center area. The control portion is configured to carry out the halftoning process upon the center area and the edge area lying to the one side in the prescribed direction in the dither mask being associated with the input data for forming the center portion and the edge portion lying to the one side in the prescribed direction in the first band image, and upon the center area in the dither mask being associated with the input data for forming the edge portion lying to the other side in the prescribed direction in the first band image.

According to this fluid ejection device, lightening of the edge portions of an image can be prevented, and degradation of image quality can be minimized.

The fluid ejection device, wherein the halftoning process is carried out upon the center area and the edge area lying to the other side in the prescribed direction in the dither mask being associated with the input data for forming the center portion and the edge portion lying to the other side in the prescribed direction in the third band image, and upon the center area in the dither mask being associated with the input data for forming the edge portion lying to the one side in the prescribed direction in the third band image.

According to this fluid ejection device, lightening of the edge portions of an image can be prevented, and degradation of image quality can be minimized.

The fluid ejection device, wherein the threshold values of the dither mask associated with the input data arranged to the one side in the prescribed direction interposed by one pixel with first input data, which is the input data for forming the edge portion lying to the other side in the prescribed direction of the first band image, are inverted in the prescribed direction; the inverted threshold values are associated with the first input data; and the halftoning process is carried out; the input data to which the dither mask is associated including the same number of pixels arranged in the prescribed direction as the number of pixels arranged in the prescribed direction in the first input data.

According to this fluid ejection device, an image having good continuity of dots may be formed.

The fluid ejection device, wherein the threshold values of the dither mask associated with the input data arranged to the one side in the prescribed direction with first input data, which is the input data for forming the edge portion lying to the other side in the prescribed direction of the first band image, are inverted in the prescribed direction; the inverted threshold values are associated with the first input data; and the halftoning process is carried out; the input data to which the dither mask is associated including the same number of pixels arranged in the prescribed direction as the number of pixels arranged in the prescribed direction in the first input data.

According to this fluid ejection device, an image having good continuity of dots may be formed.

A non-transitory computer readable medium has stored thereon a program which is executable by a computer to cause the computer to create data for an image to be formed by a fluid ejection device, the fluid ejection device having: a first nozzle row having nozzles configured and arranged to eject a fluid onto a medium with the nozzles being arranged in a prescribed direction, the first nozzle row being configured to form a first band image while facing a first location on the medium; a second nozzle row having nozzles configured and arranged to eject a fluid onto the medium with the nozzles being arranged in the prescribed direction, the second nozzle row being configured to form a second band image while facing a second location on the medium; a third nozzle row having nozzles configured and arranged to ejecting a fluid onto the medium, the nozzles being arranged in the prescribed direction, and the third nozzle row being configured to form a third band image while facing a third location on the medium. When a halftoning process for converting input data composed of a plurality of arranged pixels into dot data representing dot on/off states is performed for the purpose of forming an image in which an edge portion lying to one side in the prescribed direction in the first band image overlaps an edge portion lying to the other side in the prescribed direction in the second band image, and an edge portion lying to one side in the prescribed direction in the second band image overlaps an edge portion lying to the other side in the prescribed direction in the third band image, the program controls the computer to execute function of: associating a dither mask with the input data for forming the second band image, and carrying out the halftoning process with the dither mask having edge areas that are areas at both edge portions in the prescribed direction and a center area that is an area at a center portion in the prescribed direction, and having a plurality of arranged threshold values, a number of the threshold values arranged in the prescribed direction being equal to a number of the pixels arranged in the prescribed direction in the input data for forming the second band image, and a dot generation rate in the edge areas being lower than a dot generation rate in the center area; associating the center area and the edge area lying to the one side in the prescribed direction in the dither mask with the input data for forming the center portion and the edge portion lying to the one side in the prescribed direction in the first band image to carry out the halftoning process; and associating the center area in the dither mask with the input data for forming the edge portion lying to the other side in the prescribed direction in the first band image to carry out the halftoning process.

According to this program, lightening of the edge portions of an image can be prevented, and degradation of image quality can be minimized.

A fluid ejection method is a method for a fluid ejection device having: a first nozzle row having nozzles configured and arranged to eject a fluid onto a medium with the nozzles being arranged in a prescribed direction, the first nozzle row being configured to form a first band image while facing a first location on the medium; a second nozzle row having nozzles configured and arranged to eject a fluid onto the medium with the nozzles being arranged in the prescribed direction, the second nozzle row being configured to form a second band image while facing a second location on the medium; a third nozzle row having nozzles configured and arranged to ejecting a fluid onto the medium, the nozzles being arranged in the prescribed direction, and the third nozzle row being configured to form a third band image while facing a third location on the medium; and a storage portion configured to store a dither mask used in a halftoning process for converting input data including a plurality of arranged pixels into dot data representing dot on/off states, the dither mask having a plurality of arranged threshold values. The fluid ejection method comprising: in order to form an image in which an edge portion lying to one side in the prescribed direction in the first band image overlaps an edge portion lying to the other side in the prescribed direction in the second band image, and an edge portion lying to one side in the prescribed direction in the second band image overlaps an edge portion lying to the other side in the prescribed direction in the third band image, associating the dither mask stored in the storage portion with the input data for forming the second band image, and carrying out the halftoning process with the dither mask having edge areas that are areas at both edge portions in the prescribed direction and a center area that is an area at a center portion in the prescribed direction, a number of the threshold values arranged in the prescribed direction being equal to a number of the pixels arranged in the prescribed direction in the input data for forming the second band image, and a dot generation rate in the edge areas being lower than a dot generation rate in the center area; associating the center area and the edge area lying to the one side in the prescribed direction in the dither mask with the input data for forming the center portion and the edge portion lying to the one side in the prescribed direction in the first band image to carry out the halftoning process; associating the center area in the dither mask with the input data for forming the edge portion lying to the other side in the prescribed direction in the first band image to carry out the halftoning process; and ejecting fluid from the nozzles based on the dot data acquired through the halftoning process.

According to this fluid ejection method, lightening of the edge portions of an image can be prevented, and degradation of image quality can be minimized.

A fluid ejection device includes first, second third nozzle rows, a storage portion and a control portion. The first nozzle row have nozzles configured and arranged to eject a fluid onto a medium with the nozzles being arranged in a prescribed direction, the first nozzle row being configured to form a first band image while facing a first location on the medium. The second nozzle row have nozzles configured and arranged to eject a fluid onto the medium with the nozzles being arranged in the prescribed direction, the second nozzle row being configured to form a second band image while facing a second location on the medium. The third nozzle row have nozzles configured and arranged to ejecting a fluid onto the medium, the nozzles being arranged in the prescribed direction, and the third nozzle row being configured to form a third band image while facing a third location on the medium. The storage portion is configured to store a dither mask used in a halftoning process for converting input data composed of a plurality of arranged pixels into dot data representing dot on/off states, the dither mask having edge areas that are areas at both edge portions in the prescribed direction and a center area that is an area at a center portion in the prescribed direction, and having a plurality of arranged threshold values. The control portion is configured to form, based on the dot data, an image in which an edge portion lying to one side in the prescribed direction in the first band image overlaps an edge portion lying to the other side in the prescribed direction in the second band image, and an edge portion lying to one side in the prescribed direction in the second band image overlaps an edge portion lying to the other side in the prescribed direction in the third band image. The control portion is configured to associate the dither mask stored in the storage portion with the input data, and carry out the halftoning process with the dither mask in which a number of the threshold values arranged in the prescribed direction is equal to a number of the pixels arranged in the prescribed direction in the input data for forming the second band image, and a dot generation rate in the edge areas is lower than a dot generation rate in the center area. The control portion is configured to when the edge portion lying to the other side in the prescribed direction in the first band image is to be formed, establish the nozzles of the edge portion lying to the other side in the first nozzle row as disabled nozzles that are not to be used in image formation.

According to this fluid ejection device, lightening of the edge portions of an image can be prevented, and degradation of image quality can be minimized.

The fluid ejection device, wherein when the edge portion lying to the one side in the prescribed direction in the third band image is to be formed, the control portion sets the nozzles of the edge portion lying to the one side in the third nozzle row as disabled nozzles that are not to be used in image formation.

According to this fluid ejection device, lightening of the edge portions of an image can be prevented, and degradation of image quality can be minimized.

A non-transitory computer readable medium has stored thereon a program which is executable by a computer to cause the computer to create data for an image to be formed by a fluid ejection device, the fluid ejection device having: a first nozzle row having nozzles configured and arranged to eject a fluid onto a medium with the nozzles being arranged in a prescribed direction, the first nozzle row being configured to form a first band image while facing a first location on the medium; a second nozzle row having nozzles configured and arranged to eject a fluid onto the medium with the nozzles being arranged in the prescribed direction, the second nozzle row being configured to form a second band image while facing a second location on the medium; a third nozzle row having nozzles configured and arranged to ejecting a fluid onto the medium, the nozzles being arranged in the prescribed direction, and the third nozzle row being configured to form a third band image while facing a third location on the medium. When a halftoning process for converting input data made of a plurality of arranged pixels into dot data representing dot on/off states is performed for the purpose of forming an image in which an edge portion lying to one side in the prescribed direction in the first band image overlaps an edge portion lying to the other side in the prescribed direction in the second band image, and an edge portion lying to one side in the prescribed direction in the second band image overlaps an edge portion lying to the other side in the prescribed direction in the third band image, the program controls the computer to execute function of: associating a dither mask with the input data, and carrying out the halftoning process with the dither mask having edge areas that are areas at both edge portions in the prescribed direction and a center area that is an area at a center portion in the prescribed direction, and having a plurality of arranged threshold values, a number of the threshold values arranged in the prescribed direction being equal to a number of the pixels arranged in the prescribed direction in the input data for forming the second band image, and a dot generation rate in the edge areas being lower than a dot generation rate in the center area; and when the edge portion lying to the other side in the prescribed direction in the first band image is formed, establishing the nozzles of the edge portion lying to the other side in the first nozzle row as disabled nozzles that are not to be used in image formation.

According to this program, lightening of the edge portions of an image can be prevented, and degradation of image quality can be minimized.

A fluid ejection method is a method for a fluid ejection device having: a first nozzle row having nozzles configured and arranged to eject a fluid onto a medium with the nozzles being arranged in a prescribed direction, the first nozzle row being configured to form a first band image while facing a first location on the medium; a second nozzle row having nozzles configured and arranged to eject a fluid onto the medium with the nozzles being arranged in the prescribed direction, the second nozzle row being configured to form a second band image while facing a second location on the medium; a third nozzle row having nozzles configured and arranged to ejecting a fluid onto the medium, the nozzles being arranged in the prescribed direction, and the third nozzle row being configured to form a third band image while facing a third location on the medium; and a storage portion configured to store a dither mask used in a halftoning process for converting input data including a plurality of arranged pixels into dot data representing dot on/off states, the dither mask having a plurality of arranged threshold values. The fluid ejection method includes: in order to form an image in which an edge portion lying to one side in the prescribed direction in the first band image overlaps an edge portion lying to the other side in the prescribed direction in the second band image, and an edge portion lying to one side in the prescribed direction in the second band image overlaps an edge portion lying to the other side in the prescribed direction in the third band image, associating the dither mask stored in the storage portion with the input data, and carrying out the halftoning process with the dither mask having edge areas that are areas at both edge portions in the prescribed direction and a center area that is an area at a center portion in the prescribed direction, a number of the threshold values arranged in the prescribed direction being equal to a number of the pixels arranged in the prescribed direction in the input data for forming the second band image, and a dot generation rate in the edge areas being lower than a dot generation rate in the center area; during formation of the edge portion lying to the other side in the prescribed direction in the first band image, establishing the nozzles of the edge portion lying to the other side in the first nozzle row as disabled nozzles that are not to be used in image formation; and ejecting fluid from the nozzles based on the dot data acquired through the halftoning process.

According to this fluid ejection method, lightening of the edge portions of an image can be prevented, and degradation of image quality can be minimized.

First Embodiment

Printing System

The following description of the embodiments takes the example of a printing system that includes an interconnected inkjet printer, specifically a line head printer (hereinafter termed a printer), and a computer.

Figure 1B:
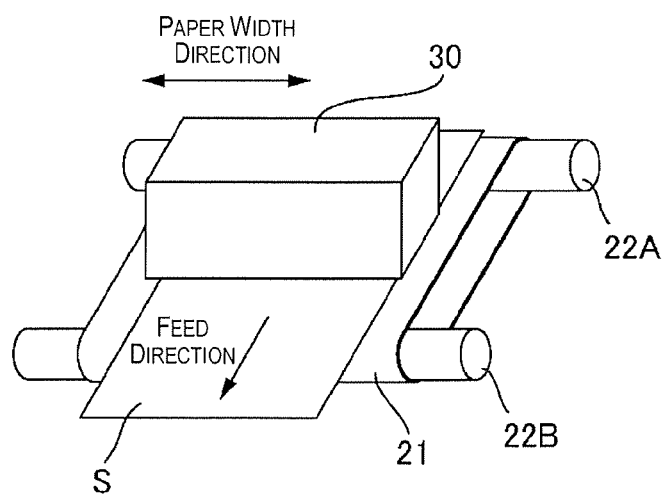
FIG. 1B is a schematic diagram.

FIG. 1A is an overall configuration block diagram of a printer 1, and FIG. 1B is a schematic diagram of the printer 1. The drawings depict the printer 1 as it feeds paper S (the medium). The printer 1, having received print data from an external device, i.e., a computer 50, controls units (a feed unit 20 and a head unit 30) with a controller 10, and prints an image onto the paper S. A sensor group 40 monitors conditions in the printer 1, and the controller 10 controls the units based on the sensed results.

The controller 10 functions as the control unit for controlling the printer 1. An interface portion 11 is used to send and receive data between an external device, i.e., the computer 50, and the printer 1. A CPU 12 functions as a processing device for controlling the printer 1 as a whole. A memory 13 provides a program storage area and a work area for the CPU 12. The CPU 12 controls the units through a unit control circuit 14, in accordance with a program stored in the memory 13.

The feed unit 20 has a feed belt 21 and feed rollers 22A, 22B, and is adapted to advance the paper S to a printable location, and to feed the paper S at a prescribed feed speed in the feed direction. As the paper S is conveyed over the feed belt 21, the paper S is fed across the feed belt 21 through rotation of the feed belt 21 by the feed rollers 22A, 22B. Optionally, the paper S is held onto the feed belt 21 from below by electrostatic attraction or vacuum suction.

The head unit 30 is used to eject droplets of ink onto the paper S, and has a plurality of heads 31. A plurality of nozzles are provided as ink ejection portions on the bottom face of each head 31. The nozzles are provided with pressure chambers (not shown) that contain ink, and with actuator elements (piezo elements) for changing the volume of the pressure chambers to eject the ink.

Figure 2A:
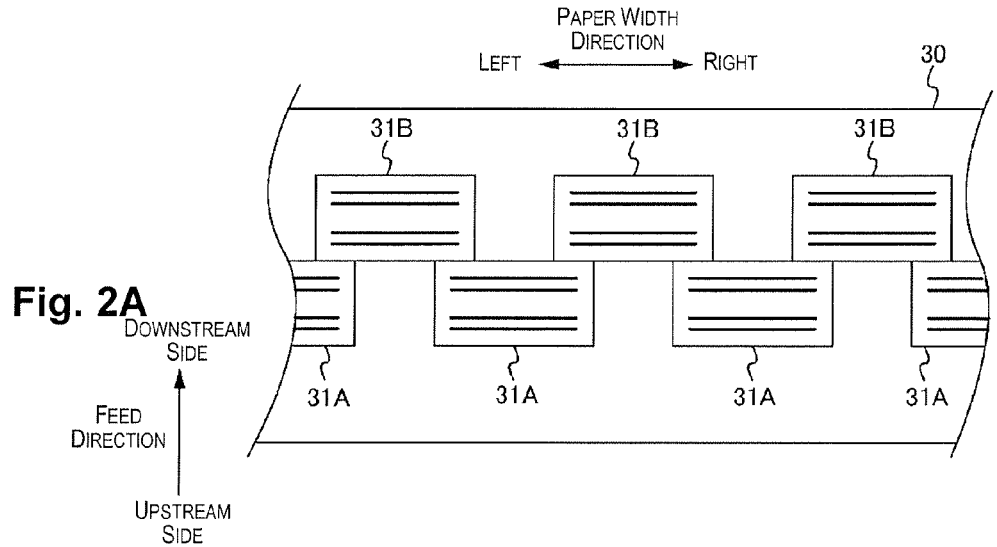
FIG. 2A is a drawing showing disposition of heads provided to a head unit.
Figure 2B:
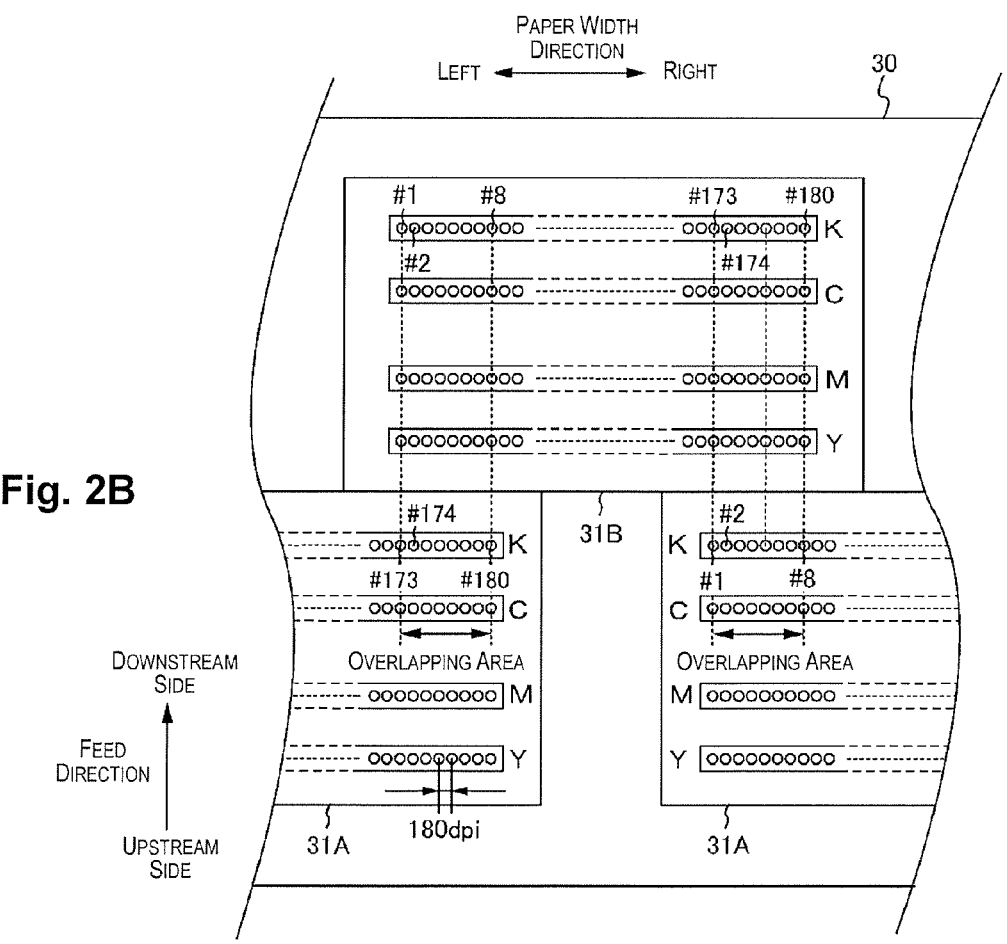
FIG. 2B is a drawing showing disposition of nozzles on the bottom faces of heads.

FIG. 2A is a drawing showing disposition of the heads 31 provided to the head unit 30, and FIG. 2B is a drawing showing disposition of nozzles on the bottom faces of the heads 31. The drawings are hypothetical depictions of the head 31 and nozzle dispositions viewed from the upper face of the head unit 30. As shown in FIG. 2A, the plurality of heads 31 are arranged in the paper width direction (corresponding to the prescribed direction) which intersects the feed direction, with the ends of adjacent heads 31 (nozzle rows) overlapping in the paper width direction. Additionally, heads 31A, 31B situated adjacently in the paper width direction are disposed in staggered fashion in the feed direction (specifically, the heads 31 are positioned in a zigzag arrangement). Of the heads 31A, 31B situated adjacently in the paper width direction, heads 31 lying towards the upstream side in the feed direction are termed "upstream heads 31A" and heads 31 lying towards the downstream side in the feed direction are termed "downstream heads 31B."

As shown in FIG. 2B, on the bottom face of each head 31 there are formed a black nozzle row K for ejecting black ink, a cyan nozzle row C for ejecting cyan ink, a magenta nozzle row M for ejecting magenta ink, and a yellow nozzle row Y for ejecting yellow ink. Each nozzle row is composed of 180 nozzles (from #1 to #180). The nozzles of each nozzle row are arranged at a given spacing (e.g., 180 dpi) in the paper width direction. Nozzles belonging to each nozzle row are assigned progressively smaller numbers (from #1 to #180) starting from the left side in the paper width direction.

Eight end portion nozzles (from #173 to #180) lying to the right side in the paper width direction in the upstream nozzles 31A overlap eight end portion nozzles (from #1 to #8) lying to the left side in the paper width direction in the downstream nozzles 31B, and eight end portion nozzles (from #1 to #8) lying to the left side in the paper width direction in the upstream nozzles 31A overlap eight end portion nozzles (from #173 to #180) lying to the right side in the paper in the downstream nozzles 31B. For adjacent heads 31 in the paper width direction, areas of nozzle overlap are termed "overlapping areas," and nozzles belonging to overlapping areas are termed "overlapping nozzles." The location of an overlapping nozzle (e.g., #173) in the paper width direction in an upstream head 31A is the same as the location of an overlapping nozzle (e.g., #1) in the paper width direction in the corresponding downstream head 31B. Accordingly, the nozzles are arranged with equidistant spacing (180 dpi) across the entire head unit 30 in the paper width direction.

According to this printer 1, when print data is received, first, the controller 10 sends the paper S onto the feed belt 21. Subsequently, the paper S is fed over the feed belt 21 at a constant rate of speed without stopping, and comes to face towards the nozzle faces of the head 31. With the paper S facing towards the nozzle faces while being fed over the feed belt 21, ink droplets are ejected intermittently from the nozzles based on the print data. As a result, there is printed out a two-dimensional image composed of dot rows (herein also referred to as raster lines) extending along the feed direction arranged in the paper width direction.

Printing Method

Density Variations

FIG. 3A is a drawing showing formation of a dot row along the paper width direction by an upstream head 31A and a downstream head 31B. For simplicity of description, it is assumed that the number of nozzle rows belonging to each head 31 is one, the number of nozzles belonging to each head 31 is eight, and the number of nozzle rows belonging to the overlapping area is four. Dots produced by the upstream head 31A are shown as black circles (●), and dots produced by the downstream head 31B are shown as white circles (○). FIG. 3A depicts a printed row that forms a row of dots along the paper width direction, through alternating use of the overlapping nozzles of the upstream head 31A and of the downstream head 31B. In FIG. 3A, the location of an overlapping nozzle (e.g., #5) of the upstream head 31A in the paper width direction and the location of the corresponding overlapping nozzle (e.g., #1) of the downstream head 31B are the same. That is, the mounting locations of the upstream head 31A and the downstream head 31B are within design specifications. Therefore, dots can be formed at equidistant intervals in the paper width direction.

Let it be assumed that, on the other hand, the upstream head 31A and the downstream head 31B have been mounted at locations that deviate in the paper width direction from the design specification mounting locations, for example. In this case, dots produced by the heads 31A, 31B overlap resulting in poor coverage of the paper, or in image portions that are formed at interstices (overlapping areas) of the upstream head 31A and the downstream head 31B and that differ in density from the density of other areas. Deviation in the mounting locations of the upstream head 31A and the downstream head 31B in the feed direction likewise results in differences between the density in image portions formed by overlapping areas and the density in other areas.

Specifically, density variations arise from mounting error of the upstream head 31A and the downstream head 31B. Density variations of images can be eliminated by establishing density variation correction values for those image portions that are formed by overlapping areas, doing so according to the mounting locations of the upstream head 31A and the downstream head 31B.

FIG. 3B is a drawing depicting dot formation as the paper S skews. In FIG. 3B, let it be assumed that the mounting locations of the upstream head 31A and the downstream head 31B are in conformance with the design specifications. The disposition of the upstream head 31A and the downstream head 31B is shifted in the feed direction. Therefore, in order to form a dot row along the paper width direction, it is necessary for the ink ejection timing of the upstream head 31A and the ink ejection timing of the downstream head 31B to differ. If the paper S skews during this time lag of the ink ejection timing, dots cannot be formed at equidistant spacing in the paper width direction. For example, let it be assumed that, as shown in FIG. 3B, during the interval between ink ejection from the upstream head 31A and ink ejection from the downstream head 31B, the paper S is fed while being shifted to the left in the paper width direction. As a result, dots produced by the downstream head 31B are formed at dot locations to the right of where they properly should be formed. In this instance, just as when the upstream head 31A and the downstream head 31B are mounted with deviation in the paper width direction away from the design specifications mounting locations, density variations will arise in the image.

As the paper S skews in the paper width direction in this way, the spacing in the paper width direction between dots formed by the upstream head 31A and dots formed by the downstream head 31B varies during printing. As a result, density of images formed by overlapping areas will vary according to the location in the feed direction. For this reason, density variations arise in images even if the mounting locations of the upstream head 31A and the downstream head 31B conform to the design specifications, and even if density variation correction values have been established according to the mounting locations of the upstream head 31A and the downstream head 31B.

This phenomenon is not limited to instances of skew by the paper S; there are instances in which the mounting locations of the upstream head 31A and the downstream head 31B fluctuate due to change over time. In such instances, even if density variation correction values have been established according to the mounting locations of the upstream head 31A and the downstream head 31B during the printer manufacturing process, these may no longer be able to correct density variations associated with change over time. Variation in the feed speed of the paper S may also give rise to density variations along the feed direction in images formed by overlapping areas.

Printing Method of Comparative Example

Figure 4:
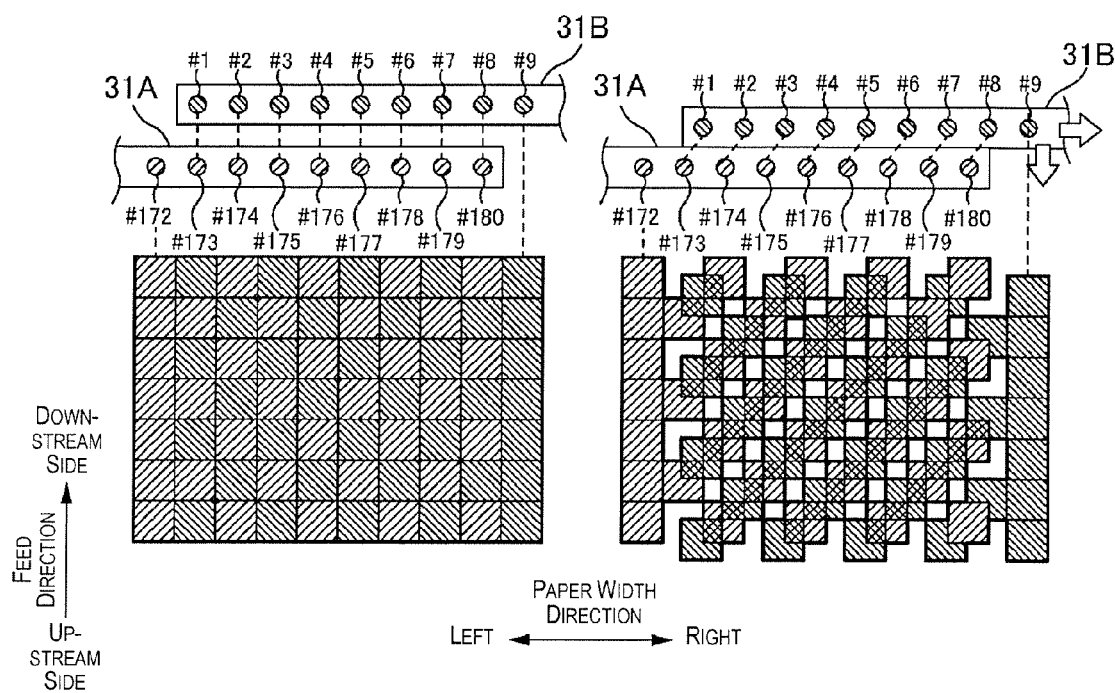
FIG. 4 is a drawing showing density variation in a printing method of a comparative example.

FIG. 4 is a drawing showing density variation in a printing method of a comparative example. The drawing at left in FIG. 4 shows dots formed in an ideal state. An ideal state is one in which the mounting locations (relative locations) of the upstream head 31A and the downstream head 31B conform to design specifications, or density variation correction values have been set according to the mounting locations of the upstream head 31A and the downstream head 31B, and feed errors such as skew or speed variations of the paper S do not occur. The drawing at right in FIG. 4, on the other hand, depicts dots formed in an instance where deviation of relative position of the heads 31 or a feed error has occurred.

The dot data that the printer 1 uses to print an image is composed of a plurality of pixels, each pixel indicating a dot on/off state. In the drawing, one cell represents one pixel area (an area on the paper corresponding to a pixel in the data) and the dot formed in the pixel area. Dots formed by the upstream head 31A are indicated by left downward-sloping crosshatch cells and dots formed by the downstream head 31B are indicated by right downward-sloping crosshatch cells. The print data for printing the image of FIG. 4 indicates that dots are to be formed on all pixels.

According to the printing method of the comparative example, dots that are to be formed in overlapping areas are formed in alternating fashion in the feed direction and the paper width direction by the overlapping nozzles (#173 to #180) of the upstream head 31A and the overlapping nozzles (#1 to #8) of the downstream head 31B. Specifically, according to the printing method of the comparative example, dots that are to be formed in overlapping areas are formed by overlapping nozzles of either the upstream head 31A or the downstream head 31B. In this case, in the ideal state as depicted in the drawing at left in FIG. 4, dots are formed without gaps by the overlapping nozzles, and the density of the image in the overlapping area is the desired image density. However, if there is deviation of relative position of the heads 31 or if a feed error occurs, dots formed by overlapping nozzles of the heads 31A, 31B may overlap as shown in the drawing at right in FIG. 4, and coverage of the paper may be poor. As a result, the image formed in the overlapping area may have lighter density.

Thus, with the printing method of the comparative example, density differences arise between an image formed in an overlapping area in the ideal state (the drawing at left in FIG. 4) on the one hand, and an image formed in an overlapping area in a state where the relative position of the heads 31 has deviated or a feed error has occurred (the drawing at right in FIG. 4) on the other.

Printing Method of the Present Embodiment

Figure 5A:
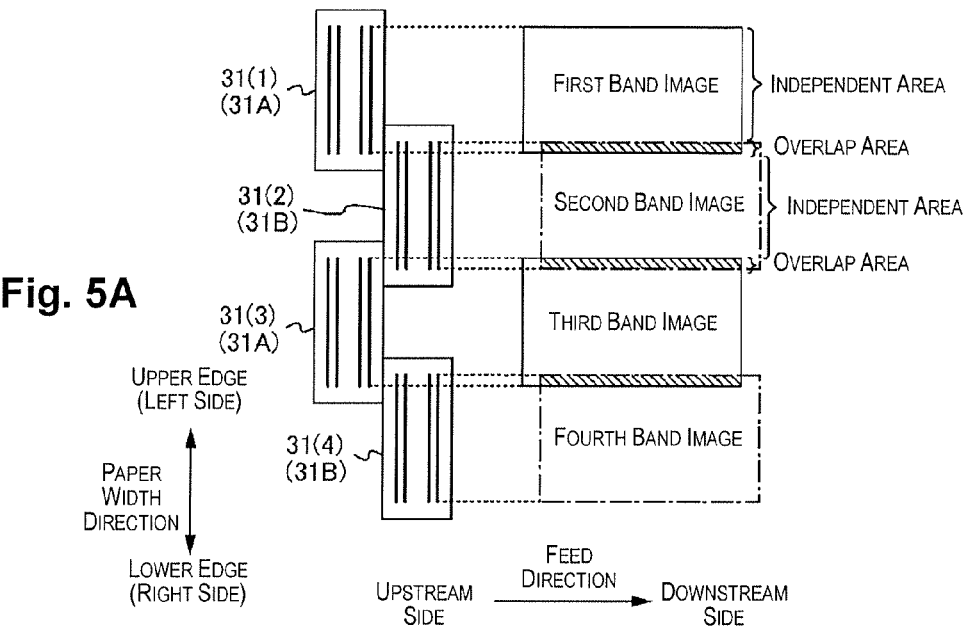
FIG. 5A is a drawing illustrating an image printed according to the embodiment.

FIG. 5A is a drawing illustrating an image printed according to the present embodiment. For the purposes of the following discussion, the printer 1 is assumed to have four heads 31. The left side in the paper width direction in FIG. 2 is designated as the upper edge side (corresponding to the other side in the prescribed direction), and the right side in the paper width direction is designated as the lower edge side (corresponding to the one side in the prescribed direction). The four heads 31 are designated, in order from the upper edge side in the paper width direction, as the first head 31(1), the second head 31(2), the third head 31(3), and the fourth head 31(4). The images formed by the heads 31 are termed "band images." When the first head 31(1) (corresponding to the first nozzle row) situated closest towards the upper edge side in the paper width direction is facing a prescribed location on the paper (corresponding to the first location), a first band image (corresponding to the first band image) is formed; when the central second head 31(2) and third head 31(3) (corresponding to the second nozzle row) are facing a prescribed location on the medium (corresponding to the second location), a second band image and a third ban image (corresponding to the second band image) are formed; and when the fourth head 31(4) (corresponding to the third nozzle row) situated closest towards the lower edge side in the paper width direction is facing a prescribed location on the paper (corresponding to the third location), a fourth band image (corresponding to the third band image) is formed.

In the printer 1 according to the present embodiment, because the edge portions of the heads 31 are disposed in an overlapping arrangement, images are formed by overlapping edge portions of band images. For example, an image is formed such that the edge portion at the lower edge side of the first band image and the edge portion at the upper edge side of the second band image overlap. In band images, areas that are formed by overlapping nozzles situated at nozzle row edge portions are termed "overlapping areas," and areas that are formed by non-overlapping nozzles different from the overlapping nozzles are termed "independent areas." Overlapping areas are composed of raster lines formed by two overlapping nozzles that respectively belong to adjacent heads 31 in the paper width direction, while independent areas are composed of raster lines formed by a single non-overlapping nozzle.

Figure 5B:
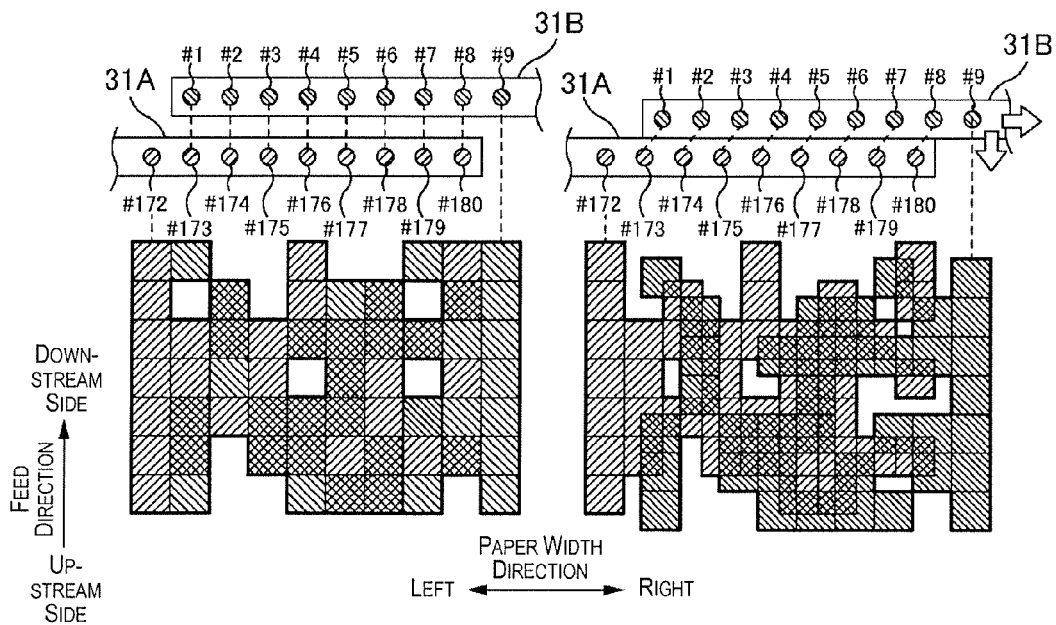
FIG. 5B is a drawing showing density variation in the printing method of the embodiment.

FIG. 5B is a drawing showing density variation in the printing method of the present embodiment. The drawing at left in FIG. 5B shows dots formed in an ideal state, while the drawing at right in FIG. 5B depicts dots formed in an instance where deviation of relative position of the heads 31 or a feed error has occurred.

According to the printing method of the present embodiment, even where the density indicated by image data is the density at which dots are to be formed throughout the entire image area, some of the dots that are produced by the overlapping nozzles of the upstream head 31A overlap dots that are produced by the overlapping nozzles of the downstream head 31B. That is, there is partial overlap of dots of the upstream head 31A and dots of the downstream head 31B, which properly should be formed in different pixel areas. In the drawing at left in FIG. 5B, pixel areas having crosshatching are pixel areas that are formed with overlapping dots produced by overlapping nozzles belonging to the two heads 31A, 31B.

By adopting this feature, even if the relative position of the heads 31 has deviated or a feed error has occurred, density fluctuations of images formed in overlapping areas may be minimized, as shown in FIG. 5B. The reason is that, whereas dots that were formed independently by overlapping nozzles of the heads 31A, 31B are overlapped anew, dots that in the ideal state were overlapping become shifted and fill in new portions of the paper. That is, according to the printing method of the present embodiment (FIG. 5B), density fluctuations arising in images formed in overlapping areas due to deviation of relative position of the heads 31 or a feed error can be minimized, as compared with the printing method of the comparative example (FIG. 4).

In preferred practice, in the ideal state (the drawing at left in FIG. 5B), the overlapping dots formed by the two heads 31A, 31B are dispersed. If it is supposed that overlapping dots formed by the two heads 31A, 31B are concentrated at one location, there may be instances in which dots that overlap in the ideal state continue to overlap, in spite of the fact that dots which, in the ideal state, were formed independently are now overlapped due to deviation of relative position of the heads 31 and so forth. If this happens, coverage of the paper may fluctuate, resulting in fluctuations of density in images formed in overlapping areas.

Thus, according to the present embodiment, printing is carried out based on print data designed such that, in the ideal state, some dispersed dots produced by the overlapping nozzles of the upstream head 31A are formed overlapping dots produced by the overlapping nozzles of the downstream head 31B. As a result, notwithstanding, for example, deviation of relative position of the heads (31A, 31B) from the time that density variation correction values were calculated for image portions formed by overlapping areas (overlap areas), density fluctuations of the overlap areas will be minimal, and therefore the effectiveness of the density variation correction values will be preserved. Additionally, notwithstanding, for example, skew of the paper or deviation in paper feed speed in the course of printing, density fluctuations of overlap areas will be minimal, and therefore image quality degradation may be minimized.

Moreover, because even in the ideal state some of the dots produced by the overlapping nozzles of the upstream head 31A and some of the dots produced by the overlapping nozzles of the downstream head 31B are formed with overlap, the overlap areas are somewhat lighter in density than the independent areas. Thus, optionally, density correction values may be established for the overlap areas. For example, a prescribed density test pattern may be actually printed out with the printer 1, and then density correction values may be computed for the overlap areas based on density differences occurring between the overlap areas and the independent areas in the test pattern results.

Print Data Creation Process

Figure 6:
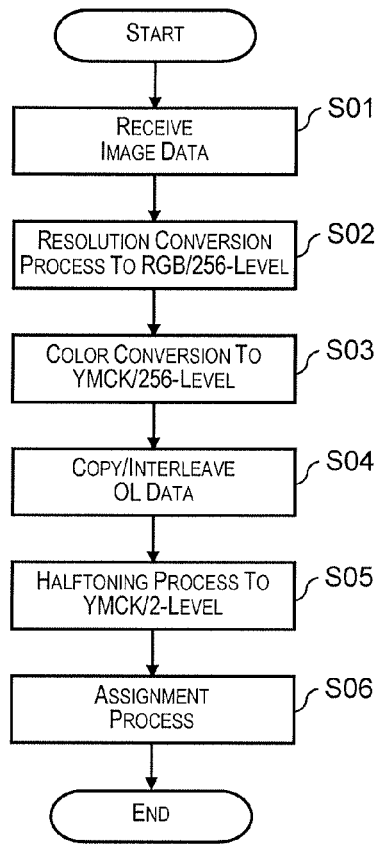
FIG. 6 is a drawing showing the flow of a print data creation process.

FIG. 6 is a drawing showing the flow of a print data creation process. Following is a description of a creation process of print data for enabling the printer 1 to carry out the printing method depicted in FIG. 5. A printer driver has been installed on the computer 50 which is connected to the printer 1, and in accordance with a program stored in memory, the printer driver utilizes the hardware resources of the computer 50 to create print data. Optionally, the printer driver may be recorded onto a recording medium (computer-readable recording medium) such as CD-ROM, or downloaded to the computer from the Internet.

Upon receiving image data from any of various application programs (S01), the printer driver carries out a resolution conversion process (S02). A resolution conversion process refers to a process for converting the received image data to the proper resolution for printout onto paper. Subsequent to the resolution conversion process the image data is 256-level (high level) RGB data represented by the RGB color space. Next, by a color conversion process, the printer driver converts the RGB data to YMCK data corresponding to the colors of the inks ejected by the printer 1 (S03). For ease of description, herein, the direction corresponding to the feed direction in the data shall be termed the feed direction, and the direction corresponding to the paper width direction in the data shall be termed the paper width direction. The 256-level YMCK data (corresponding to input data) is composed of a plurality of pixels arranged in the feed direction and the paper width direction.

By a halftoning process, the printer driver converts the 256-level data (high level data) to low-level data that can be printed by the printer 1 (S05). Specifically, through the halftoning process, the 256-level data is converted to dot data indicating the dot on/off state. For example, where the printer 1 is able to form dots of one size, the data is converted to 2-level data indicating whether to form a "dot" or "no dot" on each pixel.

The printer driver creates the dot data in such a way that some dispersed dots produced by the overlapping nozzles of the upstream head 31A and the downstream head 31B overlap as depicted in FIG. 5B. For this purpose, the halftoning process to create the dot data assigned to the overlapping nozzles of the upstream head 31A and the halftoning process to create the dot data assigned to the overlapping nozzles of the downstream head 31B are carried out separately (carried out independently).

For this reason, prior to the halftoning process, the printer driver copies the 256-level data that is assigned to the overlapping areas (hereinafter termed OL data), and interleaves the copied OL data next to the original OL data in the paper width direction (S04). Either the original OL data or the copied data is assigned, for example, to the overlapping nozzles at the lower edge side of the upstream head 31A, while the other is assigned to the overlapping nozzles at the upper edge side of the downstream head 31B which is arranged next to the upstream head 31A in the paper width direction. Through this operation, 256-level data for forming the band images to be printed out by the heads 31 is arranged in the paper width direction.

Figure 7:
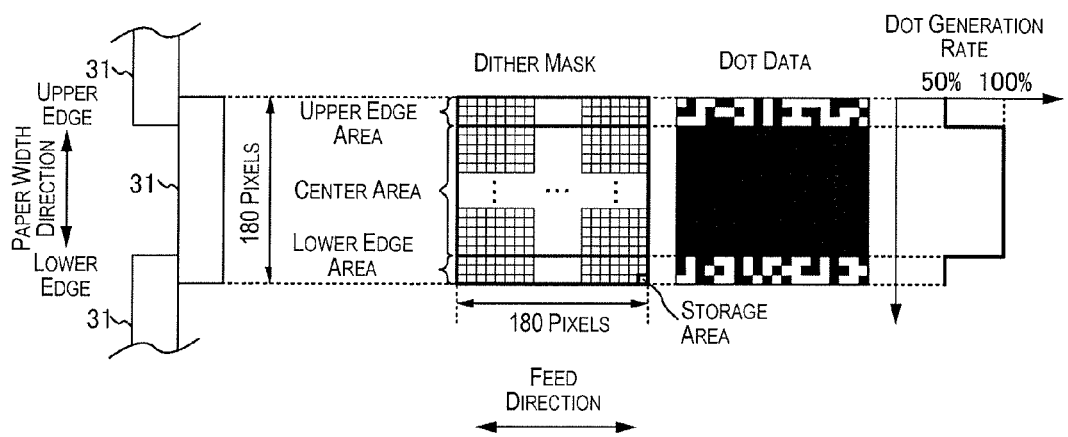
FIG. 7 is a drawing illustrating a dither mask used in a halftoning process.

FIG. 7 is a drawing illustrating a dither mask used in a halftoning process. In the present embodiment, the halftoning process is carried out by a dither method using a dither mask. The dither mask is composed of storage elements which are arranged in the paper width direction and in the feed direction; threshold values are stored in the storage elements. Dot on/off states are determined based on the magnitude relationship of the threshold value of a given storage element of the dither mask, and the gray level indicated by the pixel of the 256-level data corresponding to that storage element. For example, if the threshold value of a given storage element is 1 and the gray level indicated by the pixel corresponding to that storage element is 77, the pixel is determined to be a pixel on which to form a dot. With the dither method, for each of individual unit areas (for each individual areas assigned by the dither mask), dots can be generated at a distribution appropriate for the gray level (density) indicated by the pixels. Also, with a method of establishing threshold values in a dither mask, dispersed dots may be generated, or the dot generation rate may be adjusted on an individual area basis. Here, the dither mask is assumed to be stored in memory (corresponding to the storage portion) of the computer 50 when the printer driver is installed on the computer 50.

The paper width direction size of the dither mask used in the present embodiment is equivalent to the paper width direction size of the band images (FIG. 5A) formed by the heads 31 (equivalent to the paper width direction size of the band image formed by the second head 31(2) or the third head 31(3) not situated at the edges in the paper width direction). Specifically, the number of threshold values arranged in the paper width direction in the dither mask is equal to the number of pixels arranged in the paper width direction in the 256-level data for forming the band image. As shown in FIG. 2B, where the number of nozzles belonging to a single nozzle row is 180, the number of pixels arranged in the paper width direction in the 256-level data for forming the band image is 180. Therefore, the number of threshold values arranged in the paper width direction in the dither mask is 180. The number of threshold values arranged in the feed direction in the dither mask may be any number such that the repeating cycle of the dither mask is not readily visible; in this case, it is 180.

The dither mask used in the present embodiment has an upper edge area, a center area, and a lower edge area. The upper edge area (corresponding to an edge area) is associated with the 256-level data that has been assigned to the overlapping nozzles at the upper edge side of the nozzle row, and the lower edge area (corresponding to an edge area) is associated with the 256-level data that has been assigned to the overlapping nozzles at the lower edge side of the nozzle row. Specifically, the upper edge area and the lower edge area are associated with the 256-level data for the purpose of forming the overlap areas of the band images (FIG. 5A). Where the number of overlapping nozzles at the upper edge side of the nozzle row is eight, the number of threshold values arranged in the paper width direction in the upper edge area is eight (however, in FIG. 7, only three threshold values are shown for the sake of simplicity). Likewise, where the number of overlapping nozzles at the lower edge side of the nozzle row is eight, the number of threshold values arranged in the paper width direction in the lower edge area is eight. The center area is associated with the 256-level data that has been assigned to the non-overlapping nozzles of a nozzle row. Specifically, the center area is associated with the 256-level data for the purpose of forming the independent areas of the band images. As shown in FIG. 2B, where the number of non-overlapping nozzles of the nozzle row is 164, the number of threshold values arranged in the paper width direction in the center area is 164.

The dot generation rate of the center area of the dither mask (100%) is lower than the dot generation rates of the upper edge area and the lower edge area (50%). Specifically, in the area to which the center area has been assigned dots are generated with a distribution reflecting the gray levels indicated by the pixels, whereas in the areas to which the upper edge area and the lower edge area have been assigned dots are formed at a distribution that is half as dense as the distribution normally reflecting the gray levels indicated by the pixels. The dot data depicted in FIG. 7 is the result of halftoning processing carried out by associating a dither mask with 256-level data composed of pixels that indicate maximum gray levels. In the dot data, blacked-out areas indicate pixels on which dots are formed, while whited-out areas indicate pixels on which dots are not formed. From this drawing of dot data it may be appreciated that the dot generation rate of the center area is 100%, while the dot generation rate of the upper edge area and the lower edge area is 50%. In order to create a higher dot generation rate in the center area and a lower dot generation rate in the upper edge area and the lower edge area, a greater number of threshold values having smaller values may be provided in the center area, and a greater number of threshold values having larger values may be provided in the upper edge area and the lower edge area, for example.

The printer driver associates this dither mask with the 256-level data for forming each of the band images, and carries out the halftoning process (the details are discussed later). The effect of doing so is that, in the band image, the 256-level data for forming the independent area at the center (herein referred to as independent data) undergoes halftoning processing by the center area of the dither mask. As a result, the dot data for forming the independent area has a dot distribution reflecting the density (gray level) indicated by the 256-level data. On the other hand, in the band image, the 256-level data for forming the overlap area at the upper edge side (OL data) undergoes halftoning processing by the upper edge area of the dither mask, while the 256-level data for forming the overlap area at the lower edge side (OL data) undergoes halftoning processing by the lower edge area of the dither mask. As a result, the dot data for forming the overlap areas at the upper edge side and the lower edge side has a dot distribution reflecting density (gray level) equivalent to half the density indicated by the 256-level data.

The independent area does not overlap band images formed by other heads 31. For this reason, the independent area can be imparted with the density indicated by the 256-level data by selecting a dot distribution that reflects the density indicated by the 256-level data as the dot distribution of the independent area. On the other hand, the overlap areas overlap band images (overlap areas) formed by other heads 31. For this reason, by selecting a dot distribution reflecting density equivalent to half the density indicated by the 256-level data as the dot distribution of the overlap areas at the upper edge side and the lower edge side, the overlapping images formed by the overlap areas at the upper edge side and the lower edge side can be imparted with the density indicated by the 256-level data. By using the dither mask shown in FIG. 7 in this manner to carry out halftoning processing of the 256-level data for forming the band images, images of density indicated by the 256-level data can be printed out.

Assuming that, in the dither mask, the upper edge area and the lower edge area are not established separately from the center area, and that their dot generation rates are no different, it would be necessary to correct the 256-level data according to the usage rate of the overlapping nozzles at the upper edge side and the usage rate of the overlapping nozzles at the lower edge side. For example, if the usage rates of the overlapping nozzles at the upper edge side and the overlapping nozzles at the lower edge side are each 50%, the gray level values indicated by the 256-level data assigned to the overlapping nozzles must be halved. For this reason, as with the dither mask shown in FIG. 7, an upper edge area and a lower edge area for use in a halftoning process of OL data, and a center area for use in a halftoning process of independent data, are established separately, making the dot generation rates thereof different, whereby the printer driver is able to carry out the halftoning process on unmodified 256-level data and processing may be carried out more readily.

The dots formed by overlapping nozzles of the upstream head 31A and the downstream head 31B can be dispersed and overlapped through selection of the threshold values that respectively make up the upper edge area and the lower edge area of the dither mask, and of the arrangement of the threshold values. As a result, an image having minimal density fluctuations in overlap areas may be printed out, even if deviation of relative position of the heads 31 or a feed error has occurred. Therefore, by separately establishing the upper edge area for halftoning processing of OL data for the upper edge side and the lower upper edge area for halftoning processing of OL data for the lower edge side, the degree of freedom of dot generation location may be increased (the degree of freedom in design of the dither mask may be increased), and images of better image quality may be printed out.

In the dither mask of FIG. 7, the dot generation rate of the upper edge area and the dot generation rate of the lower edge area are each 50%; however, no limitation thereto is imposed, and the dot generation rate of either area may be increased. Also, while in the dither mask of FIG. 7, the dot generation rate throughout the entire upper edge area is a constant 50% and the dot generation rate throughout the entire lower edge area is a constant 50%, no limitation thereto is imposed. For example, optionally, in the upper edge area the dot generation rate may gradually increase from the area at the upper edge side toward the area at the lower edge side, while in the lower edge area the dot generation rate may gradually decrease from the area at the upper edge side toward the area at the lower edge side. This creates a gradual transition from the band image produced by the upstream head 31A to the band image produced by the downstream head 31B, for example, and therefore the interstice between band images is not readily apparent.

According to the printing method of the present embodiment (FIG. 5B), in the ideal state, some of the dots produced by overlapping nozzles of the upstream head 31A and some of the dots produced by overlapping nozzles of the downstream head 31B are formed overlapping. Therefore, overlap areas which are formed by the overlapping nozzles are somewhat lighter than independent areas which are formed by non-overlapping nozzles. Accordingly, dot generation rates in the upper edge area and the lower edge area may be increased to greater than 50%. In this case, it will be necessary to establish correction values for overlap areas with respect to independent areas.

Subsequent to the halftoning process of the 256-level data, the printer driver assigns the dot data which is the result of the halftoning process to the nozzles, and sorts the dot data into the proper sequence for transmission to the printer 1 (S06). The printer driver then sends the sorted dot data in sequence to the printer 1. The controller 10 of the printer 1 having received the print data then ejects ink from the heads 31 based on the print data (dot data) to faun an image on a medium. The image depicted in FIG. 5 may be printed as a result.

Halftoning Process of Comparative Example

Figure 8:
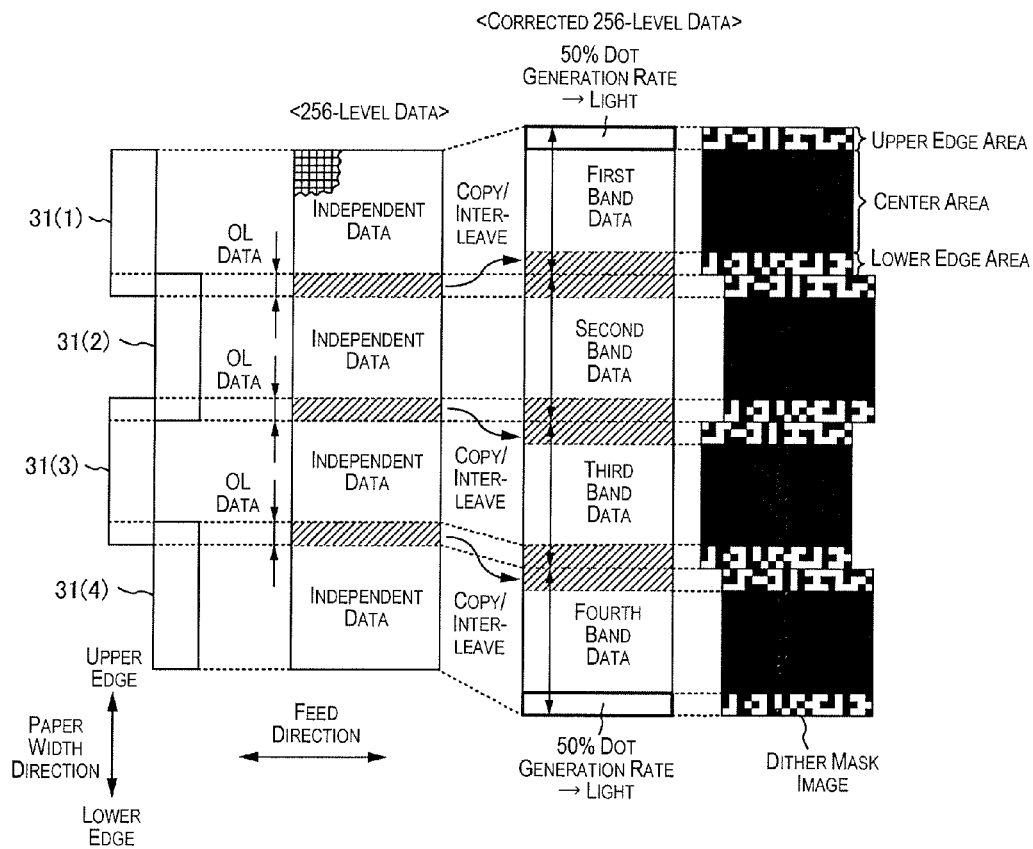
FIG. 8 is a drawing illustrating conditions of a halftoning process of a comparative example.

FIG. 8 is a drawing illustrating conditions of a halftoning process of a comparative example. In FIG. 8, correspondence relationships between a dither mask and 256-level data assigned to a first head 31(1) through a fourth head 31(4) are shown. As mentioned previously, the printer driver copies the OL data which is assigned to the overlapping nozzles, and interleaves the copied OL data next to the original OL data in the paper width direction. For the purposes of the following discussion, data prior to copying/interleaving of OL data is termed 256-level data, and data subsequent to copying/interleaving of OL data is termed corrected 256-level data. The corrected 256-level data contains, in order from the upper edge in the paper width direction, independent data and lower edge side OL data of the first head 31(1) (collectively termed first band data); upper edge side OL data, independent data, and lower edge side OL data of the second head 31(2) (collectively termed second band data); upper edge side OL data, independent data, and lower edge side OL data of the third head 31(3) (collectively termed third band data); and upper edge side OL data and independent data of the fourth head 31(4) (collectively termed fourth band data).

In the comparative example, the printer driver associates the dither mask depicted in FIG. 7 with the corrected 256-level data and carries out the halftoning process in sequence from the upper edge side in the paper width direction. FIG. 8 depicts the dot data of FIG. 7 (the results of the halftoning process of pixels indicating maximum gray level values), by way of an image of the dither mask.

As a result, of the plurality of heads 31 which are arranged in the paper width direction, in the second band data of the second head 31(2) and the third band data of the third head 31(3), i.e. heads that are not located in edge portions, the upper edge area of the dither mask is associated with upper edge side OL data, the center area is associated with independent data, and the lower edge area is associated with lower edge side OL data. Because the independent data undergoes the halftoning process by the center area having a dot generation rate of 100%, there is created dot data having a dot distribution that reflects density indicated by the 256-level data. As a result, the independent area that does not overlap band images of other heads 31 will have the density that is indicated by the 256-level data. Because the OL data undergoes the halftoning process by the upper edge area or the lower edge area having a dot generation rate of 50%, there is created dot data having a dot distribution that is half as dense as the dot distribution reflecting the density indicated by the 256-level data. As a result, overlap areas that overlap edge portions of band images of other heads 31 have half the density indicated by the 256-level data. Therefore, even if the overlap areas produced by the second head 31(2) and the third head 31(3) overlap edge portions of band images of other heads 31, higher density in these areas can be prevented.

On the other hand, the first head 31(1), which, among the plurality of heads 31 arranged in the paper width direction, is the head situated closest to the upper edge side, has non-overlapping nozzles in its upper edge portion. Specifically, the upper edge portion of the first band data is independent data, in contrast to the second band data and the third band data. Despite this, because according to the comparative example, the dither mask of FIG. 7 is associated in unmodified form with the first band data, the upper edge area and the center area are associated with the independent data, and the lower edge area is associated with the lower edge side OL data. For this reason, the upper edge portion of the first band image formed by the first head 31(1) has a dot distribution that is half as dense as the dot distribution reflecting density indicated by the 256-level data, and is visibly lighter.

Conversely, the fourth head 31(4), which, among of the plurality of heads 31 arranged in the paper width direction, is the head situated closest to the lower edge side, has non-overlapping nozzles in its lower edge portion, and the lower edge portion of the fourth band data is independent data. Despite this, because according to the comparative example, the dither mask is associated in unmodified form with the fourth band data, the upper edge area is associated with the upper edge side OL data, and the center area and the lower edge area are associated with the independent data. For this reason, the lower edge portion of the fourth band image formed by the fourth head 31(4) has a dot distribution that is half as dense as the dot distribution reflecting density indicated by the 256-level data, and is visibly lighter.

Thus, as in the comparative example, where a dither mask having a dot generation rate in the edge portions that is lower than the dot generation rate in the center portion is associated in unmodified form with 256-level data (band data) for the purpose of forming band images to be printed by heads 31 situated at the edges in the paper width direction, the edge portions of the image are printed lighter. Accordingly it is an object of the present embodiment to prevent edge portions of images from being printed lighter, and to minimize degradation of image quality of images. The halftoning process of the present embodiment is described below.

Halftoning Process

First Embodiment

Figure 9:
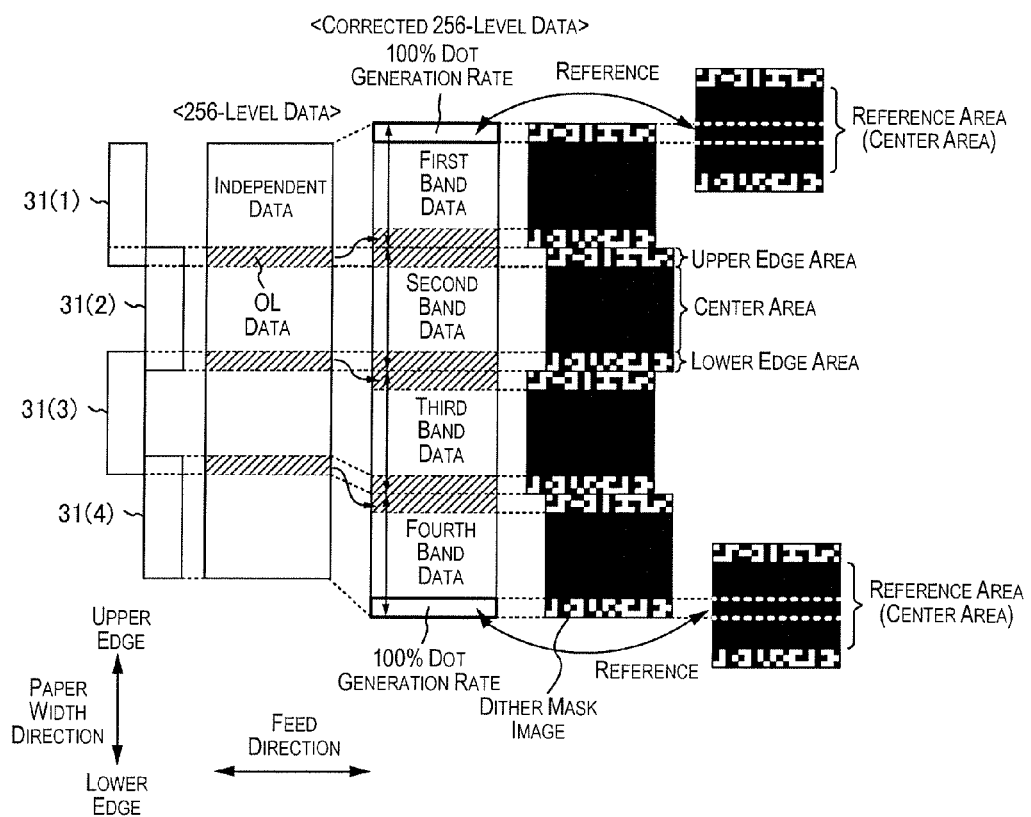
FIG. 9 is a drawing illustrating a halftoning process according to a first embodiment.

FIG. 9 is a drawing illustrating a halftoning process according to a first embodiment. In the first embodiment, the printer driver associates the center portion of the dither mask with the upper edge portion of the first band data and the lower edge portion of the fourth band data in the corrected 256-level data and performs the halftoning process. For band data to be assigned to heads 31 that are not situated at the edges in the paper width direction, the printer driver assigns a dither mask comparable to that of the comparative example (FIG. 8).

Let the number of pixels arranged in the paper width direction in the upper edge portion of the first band data with which the center area of the dither mask is associated be equal to the number of overlapping nozzles at the upper edge side of the other heads 31 excepting the first head 31(1). Here, because the number of overlapping nozzles at the upper edge side of the other heads 31 is eight, the number of pixels arranged in the paper width direction in the upper edge portion of the first band data with which the center area of the dither mask is associated is also eight. Additionally, let the number of pixels arranged in the paper width direction in the lower edge portion of the fourth band data with which the center area of the dither mask is associated be equal to the number of overlapping nozzles at the lower edge side of the other heads 31 excepting the fourth head 31(4). Here, because the number of overlapping nozzles at the lower edge side of the other heads 31 is eight, the number of pixels arranged in the paper width direction in the lower edge portion of the fourth band data with which the center area of the dither mask is associated is also eight.

The number of pixels (eight) respectively arranged in the paper width direction in the upper edge portion of the first band data and the lower edge portion of the fourth band data with which the center area of the dither mask is associated is smaller than the number of threshold values (164) arranged in the paper width direction in the center area of the dither mask. Therefore, the printer driver associates portions of the center area with the upper edge portion of the first band data and the lower edge portion of the fourth band data and performs the halftoning process. According to the first embodiment, the printer driver may perform the halftoning process of the upper edge portion of the first band data and the lower edge portion of the fourth band data with reference to any area inside the center area. Therefore, the entire center area of the dither mask may serve as the reference area to which the printer driver refers during the halftoning process of the upper edge portion of the first band data and the lower edge portion of the fourth band data.

As a result, the upper edge portion of the first band data and the lower edge portion of the fourth band data undergo halftoning processing by areas of portions of the center area of the dither mask, which has a dot generation rate of 100%. Therefore, the upper edge portion of the first band image and the lower edge portion of the fourth band image, which portions do not overlap band images of other heads 31, can be printed at the density that is indicated by the 256-level data, and lighter printing of the edge portions of the image may be prevented while degradation of image quality may be minimized. In other words, since lightening of the edge portions of the image can be prevented even if the upper edge nozzles of the first head 31(1) and the lower edge nozzles of the fourth head 31(4) are used for printing, the upper edge nozzles of the first head 31(1) and the lower edge nozzles of the fourth head 31(4) can be employed in printing. For this reason, the printable range in the paper width direction may be expanded to the greatest possible extent.

Moreover, there is no need to create separate dither masks according to the configuration of band data of the heads 31 that are situated at the edges in the paper width direction. Specifically, a common dither mask may be used both as the dither mask that is applied to band data of the heads 31 situated at the edges in the paper width direction, and as the dither mask that is applied to band data of the heads 31 that are not situated at the edges in the paper width direction. As a result, the dither mask design process can be simpler, and the memory capacity needed to store the dither mask (the memory capacity of the medium that stores the printer driver or of the computer 50 on which the printer driver is installed) can be smaller.

Halftoning Process

Second Embodiment

Figure 10A:
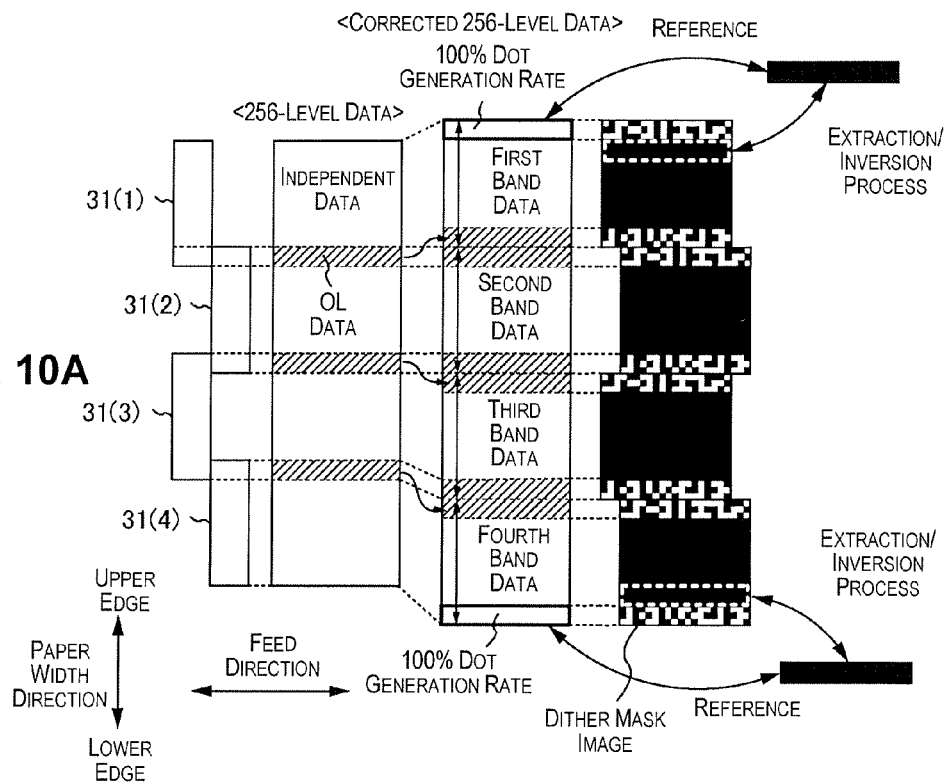
FIGS. 10A and 10B are drawings in which a halftoning process according to a second embodiment is illustrated in FIG. 10A, and a specific dither matrix association method is illustrated in FIG. 10B.
Figure 10B:
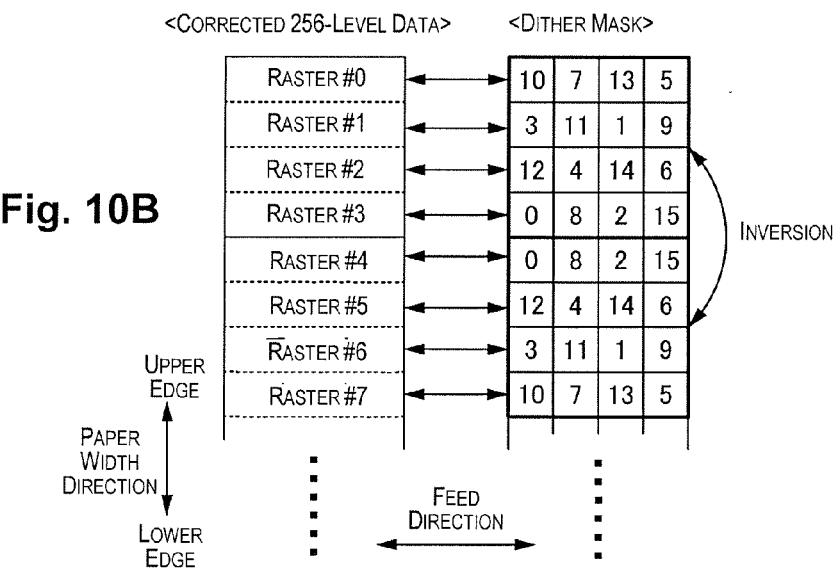

FIG. 10A is a drawing illustrating a halftoning process according to a second embodiment, and FIG. 10B is a drawing illustrating a specific dither matrix association method. In the first embodiment discussed above, the printer driver associates an area of any portion inside the center area of the dither mask with the upper edge portion of the first band data and the lower edge portion of the fourth band data (corresponding to the first input data), and performs the halftoning process. In contrast, in the second embodiment, the printer driver associates with the upper edge portion of the first band data threshold values obtained by inversion in the paper width direction of the threshold values of the dither mask that is associated with data adjacent to the lower edge side in the paper width direction and the upper edge portion of the first band data. The printer driver also associates with the lower edge portion of the fourth band data threshold values obtained by inversion in the paper width direction of the threshold values of the dither mask that is associated with data adjacent to the upper edge side in the paper width direction and the lower edge portion of the fourth band data.

The threshold values of the dither mask associated with the upper edge portion of the first band data are described in specific terms using FIG. 10B. In the drawing, rows of pixels arranged in the feed direction in the corrected 256-level data are termed rasters, and these are assigned smaller numbers starting from the upper edge side in the paper width direction. The number of overlapping nozzles at the upper edge side of the other heads 31 exclusive of the first head 31(1) is four, and the upper edge portion of the first band data to which the center area of the dither mask is associated is deemed to extend from raster #0 to raster #3.

First, from within the corrected 256-level data, the printer driver selects a number of rasters equal to the number of rasters which make up the upper edge portion of the first band data (i.e., four rasters) and which include the data adjacent to the lower edge side in the paper width direction and the upper edge portion (i.e., from raster #0 to raster #3) of the first band data. In the instance depicted in FIG. 10B, raster #4 to raster #7 are selected as these rasters. Next, the printer driver extracts the threshold values of the dither mask associated with raster #4 to raster #7, and inverts the extracted threshold values in the paper width direction. The printer driver then associates the inverted threshold values, in sequence from the upper edge side, with the upper edge portion of the first band data.

As a result, the threshold values associated with raster #7, i.e., the threshold values "10, 7, 13, 5" arranged in that order from the left side in the feed direction, are now associated in that order with the pixels belonging to raster #0, starting from the pixel at left. Analogously, the threshold values associated with raster #6 are associated with raster #1, the threshold values associated with raster #5 are associated with raster #2, and the threshold values associated with raster #4 are associated with raster #3.

In order to improve graininess in the unit image to which a dither mask is assigned, the dither mask is designed with consideration to dispersion of dots and continuity of dots within the unit image. Therefore, correlation exists among proximate threshold values in the dither mask, particularly among threshold values which are arranged in the paper width direction and the feed direction. In the first embodiment discussed previously, an area of any portion of the center area of the dither mask is associated with the upper edge portion of the first band data. Therefore, threshold values of the center area associated with data further away from the upper edge portion of the first band data may in some instances be associated with the upper edge portion of the first band data. In such instances, there may be poor continuity of dots between the image which is formed by the upper edge portion of the first band data and the image which is formed by data in proximity to the upper edge portion of the first band data.

According to the second embodiment, this issue is addressed through the use of threshold values obtained by inverting in the paper width direction threshold values associated with data that are respectively adjacent to the upper edge portion of the first band data and to the lower edge portion of the fourth band data. By so doing, threshold values can be associated with raster #3 to raster #0, without disturbing correlation of the threshold values respectively associated with raster #4 to raster #7, as shown in FIG. 10B for example. Specifically, continuity of dots from the upper edge to the lower edge of the image formed by the dot data of raster #4 to raster #7 may be brought into equivalence with continuity of dots from the lower edge to the upper edge of the image formed by the dot data of raster #0 to raster #3. As a result, good continuity of dots may be afforded in the image formed by the dot data of raster #0 to raster #7. Accordingly, image quality at the edge portions of the image to which the center area of the dither mask was applied can be made comparable to image quality in other areas.

Halftoning Process

Third Embodiment

Figure 11:
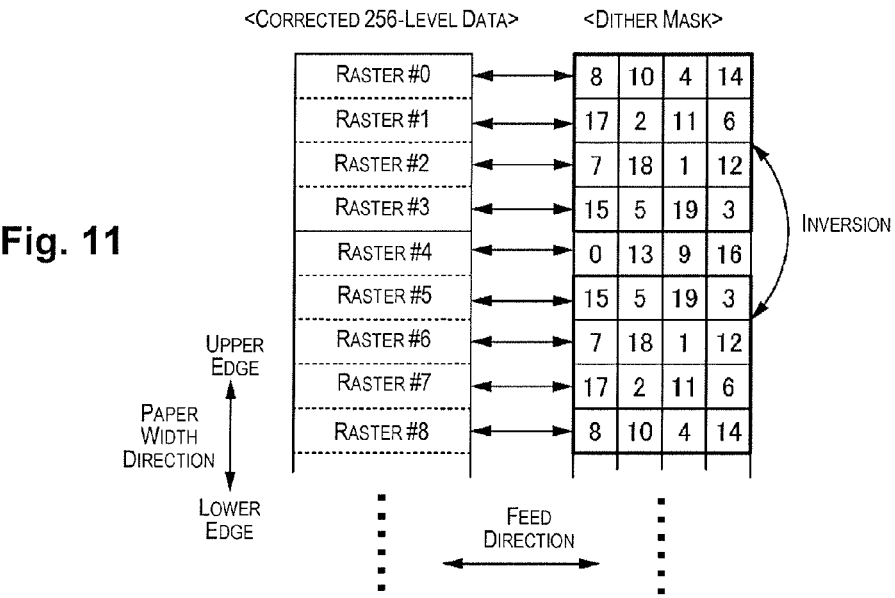
FIG. 11 is a drawing illustrating a dither matrix association method according to a third embodiment.

FIG. 11 is a drawing illustrating a dither matrix association method according to a third embodiment. The preceding second embodiment uses threshold values obtained through inversion in the paper width direction of threshold values which are associated with data that is adjacent to the upper edge portion of the first band data and to the lower edge portion of the fourth band data. Therefore, in FIG. 10B, identical threshold values are associated with raster #3 and raster #4. Consequently, pixels having small threshold values and likely to have a dot generated become arranged in the paper width direction, whereas pixels having large threshold values and unlikely to have a dot generated become arranged in the feed direction.

Thus, according to the third embodiment, the printer driver associates with the upper edge portion of the first band data threshold values obtained through inversion in the paper width direction of threshold values of a dither mask associated with data that is arranged to the lower edge side in the paper width direction interposed by one pixel with the upper edge portion of the first band data, and that contains the same number of pixels as the number of pixels arranged in the paper width direction of the upper edge portion of the first band data. The printer driver also associates, with the lower edge portion of the fourth band data, threshold values obtained through inversion in the paper width direction of threshold values of a dither mask associated with data that is arranged to the upper edge side in the paper width direction interposed by one pixel with the lower edge portion of the fourth band data, and that contains the same number of pixels as the number of pixels arranged in the paper width direction of the lower edge portion of the fourth band data.

The threshold values of the dither mask that is associated with the upper edge portion (rasters #0 to #3) of the first band data are described in specific terms with reference to FIG. 11. First, the printer driver selects rasters composed of data that is arranged to the lower edge side in the paper width direction interposed by one pixel with the upper edge portion (rasters #0 to #3) of the first band data, and equal in number to the number of rasters (i.e., four rasters) that are arranged in the paper width direction of the upper edge portion of the first band data. In the instance depicted in FIG. 11, raster #5 to raster #8 are selected as these rasters. Next, the printer driver extracts the threshold values of the dither mask that is associated with raster #5 to raster #8, and inverts the extracted threshold values in the paper width direction. The printer driver then associates the inverted threshold values, in sequence from the upper edge side, with the upper edge portion of the first band data.

As a result, the threshold values associated with raster #8 are associated with raster #0, the threshold values associated with raster #7 are associated with raster #1, the threshold values associated with raster #6 are associated with raster #2, and the threshold values associated with raster #5 are associated with raster #3.

Doing this can prevent pixels for which a dot is likely to be generated from becoming arranged in the paper width direction, or pixels for which a dot is not likely to be generated from becoming arranged in the paper width direction. Therefore, image quality can be improved at the interstices of edge portions of an image to which the center area of the dither mask was applied.

Second Embodiment

Figure 12:
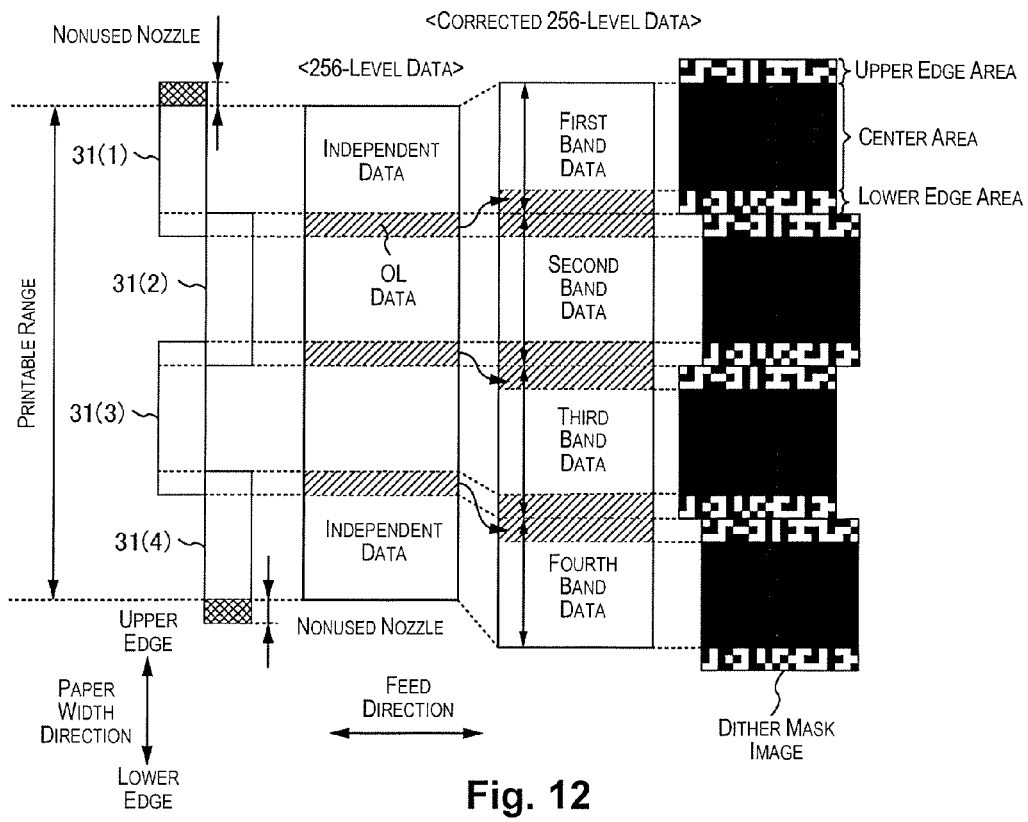
FIG. 12 is a drawing illustrating a print data creation process according to the second embodiment.

FIG. 12 is a drawing illustrating a print data creation process according to a second embodiment. In the first embodiment described previously, the nozzles of the upper edge portion of the first head 31(1) situated closest to the upper edge in the paper width direction and the nozzles of the lower edge portion of the fourth head 31(4) situated closest to the lower edge in the paper width direction are used in printing. For this reason, not only the upper edge area or lower edge area of the dither mask with a dot generation rate of 50%, but also the center area of the dither mask with a dot generation rate of 100%, are associated with the 256-level data assigned to the nozzles of the upper edge portion of the first head 31(1) and with the 256-level data assigned to the nozzles of the lower edge portion of the fourth head 31(4). This has the effect of preventing light printing of the edge portions of the image.

In contrast to this, according to the second embodiment, nozzles situated in the upper edge portion of the first head 31(1) and equal in number to the overlapping nozzles of the upper edge side of other heads 31 excepting the first head 31(1) are not used for printing. Here, because the number of overlapping nozzles of the upper edge side of other heads 31 is eight, the printer driver sets the eight nozzles #1 to #8 from the upper edge side of the first head 31(1) as disabled nozzles which are not used for printing. Analogously, nozzles situated in the lower edge portion of the fourth head 31(4) and equal in number to the overlapping nozzles of the lower edge side of other heads 31 excepting the fourth head 31(4) are not used for printing. Because the number of overlapping nozzles of the lower edge side of the other heads 31 is eight, the printer driver sets the eight nozzles #173 to #180 from the lower edge side of the fourth head 31(4) as disabled nozzles which are not used for printing. The printer driver assigns data indicating not to form a dot (NULL data) to the nozzles that have been set as disabled nozzles, and does not assign dot data obtained by halftoning processing of 256-level data.

Thereby, the number of pixels arranged in the paper width direction in the independent data of the first band data is equal to the number of threshold values arranged in the paper width direction in the center area of the dither mask. The number of pixels arranged in the paper width direction in the independent data of the fourth band data is equal to the number of threshold values arranged in the paper width direction in the center area of the dither mask. Accordingly, during the halftoning process of the first band data, the printer driver associates the center area of the dither mask with the independent data and associates the lower edge area with the lower edge side OL data, but does not use the upper edge area. During the halftoning process of the fourth band data, the printer driver associates the upper edge area with the upper edge side OL data and associates the center area with the independent data, but does not use the lower edge area. For band data assigned to heads 31 that are not situated at the edges in the paper width direction, the printer driver associates a dither mask comparable to that of the comparative example (FIG. 8).

Therefore, the 256-level data (independent data) that is assigned to the non-overlapping nozzles undergoes a halftoning process using the center area of the dither mask having a dot generation rate of 100%, while the 256-level data (OL data) that is assigned to the overlapping nozzles undergoes a halftoning process using the upper edge area or the lower edge area of the dither mask having a dot generation rate of 50%. As a result, the edge portions of the image may be prevented from being printed too lightly, and degraded image quality of images can be minimized.

According to this second embodiment, like the first embodiment, there is no need to create separate dither masks for the heads 31 that are situated at the edges in the paper width direction, and therefore the dither mask design process can be simpler, and the memory capacity needed to store the dither mask can be smaller. Also, according to the second embodiment, because there is no need for the printer driver to select an area of the dither mask for association with the upper edge portion of the first band data or the lower edge portion of the fourth band data, or to invert the threshold values of the dither mask, the process is simpler as compared with the first embodiment. However, the printable range in the paper width direction in the second embodiment is smaller than the printable range in the paper width direction in the first embodiment.

In both the first embodiment and the second embodiment above, the printer driver performs halftoning processing upon a dither mask being associated with the corrected 256-level data, or establishes disabled nozzles. Therefore, the computer 50 on which the printer driver is installed and the controller 10 of the printer 1 correspond to the control portion, while the printing system that includes the interconnected printer 1 and computer 50 corresponds to the fluid ejection device. However, these embodiments are not intended as limiting, and optionally, the processes of the printer driver may be carried out by the controller 10 in the printer 1, in which case the controller 10 of the printer 1 would correspond to the to the control portion, while the printer 1 alone would correspond to the fluid ejection device.

Modified Examples

Dither Mask Association

In the preceding embodiments, as depicted in FIG. 9, the printer driver copies the OL data (256-level data assigned to overlapping nozzles), and after interleaving the copied OL data next to the original OL data, associates a dither mask therewith; however, no limitation thereto is imposed. Optionally, the process of copying and interleaving OL data may be omitted, and the printer driver may instead, for example, associate the upper edge area and the lower edge area of the dither mask in overlapping fashion with the OL data of the 256-level data in FIG. 9. In this case, the dot data obtained when the OL data that is assigned to the overlapping nozzles of the first head 31(1) and the second head 31(2) undergoes halftoning processing by the lower edge area of the dither mask will be assigned to the overlapping nozzles of the lower edge side of the first head 31(1). The dot data obtained when the OL data that is assigned to the overlapping nozzles of the first head 31(1) and the second head 31(2) undergoes halftoning processing by the upper edge area of the dither mask will be assigned to the overlapping nozzles of the upper edge side of the second head 31(2).

In the first embodiment described previously, as shown in FIG. 9, the center area of the dither mask is assigned to both the upper edge portion of the first band data and the lower edge portion of fourth band data, for example; however, the center area of the dither mask may be assigned to only one or the other of these. In the second embodiment, as shown in FIG. 12, disabled nozzles are set up among both the upper edge nozzles of the first head 31(1) and the lower edge nozzles of the fourth head 31(4); however, disabled nozzles may be set up in only one or the other of these sets of edge nozzles. In these instances as well, the edge portion lying to one side in the paper width direction of an image may be prevented from printing lightly, and degraded image quality of printed images can be minimized as compared with the comparative example.

Printer

Figure 13:
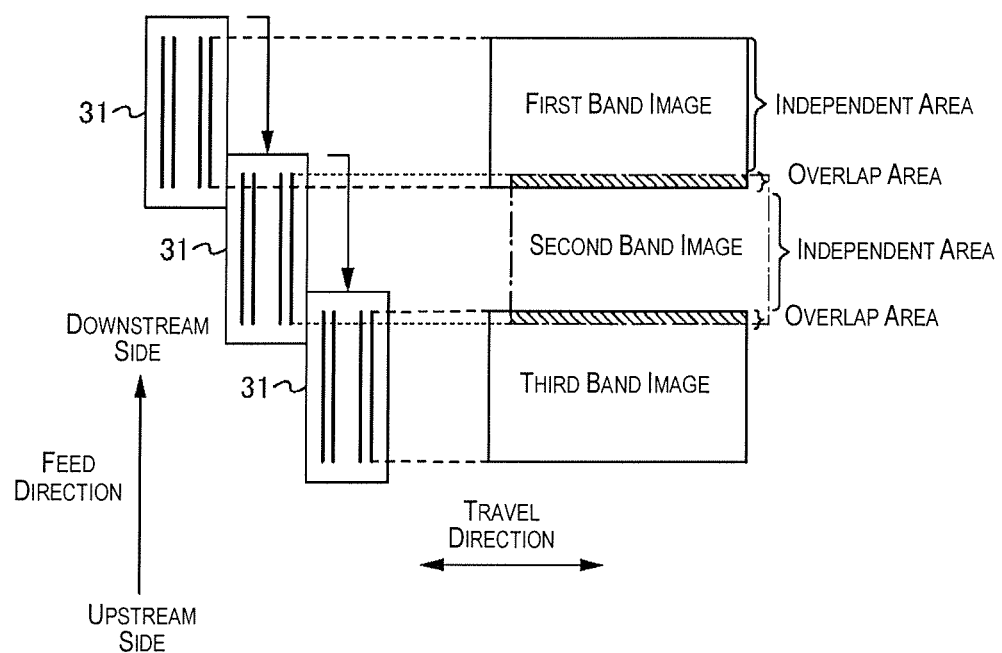
FIG. 13 is a drawing illustrating a printer of a modified example.

FIG. 13 is a drawing illustrating a printer of a modified example. The preceding embodiments relate to an example of a printer 1 in which, as shown in FIG. 1B or FIG. 2, to the lower side of a plurality of heads 31 secured arranged in a nozzle row direction (paper width direction) is fed a single sheet of paper (medium) in a feed direction that intersects the nozzle row direction while an image is printed thereon; however, this arrangement is not intended as limiting. As shown in FIG. 13, for example, the printer may be one adapted to repeatedly perform an image forming operation in which an image is formed while one head 31 travels in a direction intersecting the nozzle row direction, and an operation in which the single sheet of paper (medium) is fed towards the downstream side in the medium feed direction with respect to the heads 31.

In a printer of this design as well, through a printing method whereby the medium feed increment is set such that edge portions of band images formed by a single iteration of the image forming operation overlap, there may be printed out an image of identical configuration to that of the printer 1 of the preceding embodiments (FIG. 5A). In this case as well, the halftoning process may utilize a dither mask of identical configuration to that of preceding embodiments (FIG. 7). A first band image (corresponding to the first band image) is formed while the head 31 (corresponding to the first nozzle row) is facing a location closest to the downstream side (corresponding to the first location) in the medium feed direction (corresponding to the prescribed direction) on the paper; a second band image (corresponding to the second band image) is formed while the head 31 (corresponding to the second nozzle row) is facing a location at the center (corresponding to the second location) in the medium feed direction on the paper; and a third band image (corresponding to the third band image) is formed while the head 31 (corresponding to the third nozzle row) is facing a location closest to the upstream side (corresponding to the third location) in the medium feed direction on the paper.

However, as shown in FIG. 13, the downstream edge portion of the first band image situated closest to the downstream side in the medium feed direction and the upstream edge portion of the third band image situated closest to the upstream side are formed by non-overlapping nozzles. Accordingly, the center area of the dither mask may be associated with the 256-level data for forming the edge portions in the medium feed direction, in the manner taught in the first embodiment. Also, optionally, the downstream edge portion of the nozzle row may be switched to disabled nozzles during printing of the upstream edge portion of the first band image, and the upstream edge portion of the nozzle row may be switched to disabled nozzles during printing of the upstream edge portion of the third band image. By doing this it is possible to prevent the edge portions of the image in the medium feed direction from being printed too lightly.

As yet another printer, there may be employed, for example, a printer in which an image is formed through repetition of an operation for forming an image on a continuous sheet of paper that is fed into a printing area while a plurality of heads 31 arranged in a nozzle row direction with the edge portions thereof overlapping travels in a direction intersecting the nozzle row direction, and of an operation whereby the plurality of heads 31 travel in the paper width direction; and a portion of the medium that has yet to be printed is then fed into the printing area.

Other Embodiments

While the embodiments set forth above primarily disclose a printing system having an inkjet printer, disclosure of a print data creation method is considered to be included therein. The embodiments shown herein are intended to aid in understanding of the present invention, and should not be construed as limiting the invention. Various modifications and improvements to the invention are possible without departing from the spirit of the invention, and these equivalents shall be considered to lie within the scope thereof. In particular, the following embodiments are considered to lie within the scope of the invention.

Fluid Ejection Device

Whereas the preceding embodiments relate to an inkjet printer as an example of the fluid ejection device, no limitation thereto is imposed. Provided that the device is a fluid ejection device, implementation is possible in any of various industrial devices instead of a printer. For example, the present invention may be embodied in dyeing devices for applying patterns to fabric, color filter production devices or display production devices for producing organic EL displays and the like, or DNA chip production devices for producing DNA chips through application of a solution of dissolved DNA onto chips.

The fluid ejection technique may be a piezo technique whereby voltage is applied to actuator elements (piezo elements) to bring about expansion and contraction of ink chambers to eject fluid; or a thermal technique whereby heater elements are used to generate bubbles inside nozzles, and liquid is ejected by the bubbles. The fluid is not limited to ink or other liquids, and may be a powder.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A fluid ejection device comprising:
a first nozzle row having nozzles configured and arranged to eject a fluid onto a medium with the nozzles being arranged in a prescribed direction, the first nozzle row being configured to form a first band image while facing a first location on the medium;
a second nozzle row having nozzles configured and arranged to eject a fluid onto the medium with the nozzles being arranged in the prescribed direction, the second nozzle row being configured to form a second band image while facing a second location on the medium;
a third nozzle row having nozzles configured and arranged to ejecting a fluid onto the medium, the nozzles being arranged in the prescribed direction, and the third nozzle row being configured to form a third band image while facing a third location on the medium;
a storage portion configured to store a dither mask used in a halftoning process for converting input data composed of a plurality of arranged pixels into dot data representing dot on/off states, the dither mask having edge areas that are areas at both edge portions in the prescribed direction and a center area that is an area at a center portion in the prescribed direction, and having a plurality of arranged threshold values; and a control portion configured to
  form, based on the dot data, an image in which an edge portion lying to one side in the prescribed direction in the first band image overlaps an edge portion lying to the other side in the prescribed direction in the second band image, and an edge portion lying to one side in the prescribed direction in the second band image overlaps an edge portion lying to the other side in the prescribed direction in the third band image,
  associate the dither mask stored in the storage portion with the input data for forming the second band image, and carry out the halftoning process with the dither mask in which a number of the threshold values arranged in the prescribed direction is equal to a number of the pixels arranged in the prescribed direction in the input data for forming the second band image with a dot generation rate in the edge areas being lower than a dot generation rate in the center area, and
  carry out the halftoning process upon the center area and the edge area lying to the one side in the prescribed direction in the dither mask being associated with the input data for forming the center portion and the edge portion lying to the one side in the prescribed direction in the first band image, and upon the center area in the dither mask being associated with the input data for forming the edge portion lying to the other side in the prescribed direction in the first band image.

2. The fluid ejection device according to claim 1, wherein the halftoning process is carried out upon the center area and the edge area lying to the other side in the prescribed direction in the dither mask being associated with the input data for forming the center portion and the edge portion lying to the other side in the prescribed direction in the third band image, and upon the center area in the dither mask being associated with the input data for forming the edge portion lying to the one side in the prescribed direction in the third band image.

3. The fluid ejection device according to claim 1, wherein the threshold values of the dither mask associated with the input data arranged to the one side in the prescribed direction interposed by one pixel with first input data, which is the input data for forming the edge portion lying to the other side in the prescribed direction of the first band image, are inverted in the prescribed direction,
the inverted threshold values are associated with the first input data to carry out the halftoning process, and
the input data to which the dither mask is associated includes the same number of pixels arranged in the prescribed direction as the number of pixels arranged in the prescribed direction in the first input data.

4. The fluid ejection device according to claim 1, wherein the threshold values of the dither mask associated with the input data arranged to the one side in the prescribed direction with first input data, which is the input data for forming the edge portion lying to the other side in the prescribed direction of the first band image, are inverted in the prescribed direction,
the inverted threshold values are associated with the first input data to carry out the halftoning process, and
the input data to which the dither mask is associated includes the same number of pixels arranged in the prescribed direction as the number of pixels arranged in the prescribed direction in the first input data.

5. A non-transitory computer readable medium having stored thereon a program which is executable by a computer to cause the computer to create data for an image to be formed by a fluid ejection device, the fluid ejection device having: a first nozzle row having nozzles configured and arranged to eject a fluid onto a medium with the nozzles being arranged in a prescribed direction, the first nozzle row being configured to form a first band image while facing a first location on the medium; a second nozzle row having nozzles configured and arranged to eject a fluid onto the medium with the nozzles being arranged in the prescribed direction, the second nozzle row being configured to form a second band image while facing a second location on the medium; a third nozzle row having nozzles configured and arranged to ejecting a fluid onto the medium, the nozzles being arranged in the prescribed direction, and the third nozzle row being configured to form a third band image while facing a third location on the medium,
  when a halftoning process for converting input data composed of a plurality of arranged pixels into dot data representing dot on/off states is performed for the purpose of forming an image in which an edge portion lying to one side in the prescribed direction in the first band image overlaps an edge portion lying to the other side in the prescribed direction in the second band image, and an edge portion lying to one side in the prescribed direction in the second band image overlaps an edge portion lying to the other side in the prescribed direction in the third band image, the program controls the computer to execute function of:
  associating a dither mask with the input data for forming the second band image, and carrying out the halftoning process with the dither mask having edge areas that are areas at both edge portions in the prescribed direction and a center area that is an area at a center portion in the prescribed direction, and having a plurality of arranged threshold values, a number of the threshold values arranged in the prescribed direction being equal to a number of the pixels arranged in the prescribed direction in the input data for forming the second band image, and a dot generation rate in the edge areas being lower than a dot generation rate in the center area;
  associating the center area and the edge area lying to the one side in the prescribed direction in the dither mask with the input data for forming the center portion and the edge portion lying to the one side in the prescribed direction in the first band image to carry out the halftoning process; and
  associating the center area in the dither mask with the input data for forming the edge portion lying to the other side in the prescribed direction in the first band image to carry out the halftoning process.

6. A fluid ejection method for a fluid ejection device having: a first nozzle row having nozzles configured and arranged to eject a fluid onto a medium with the nozzles being arranged in a prescribed direction, the first nozzle row being configured to form a first band image while facing a first location on the medium; a second nozzle row having nozzles configured and arranged to eject a fluid onto the medium with the nozzles being arranged in the prescribed direction, the second nozzle row being configured to form a second band image while facing a second location on the medium; a third nozzle row having nozzles configured and arranged to ejecting a fluid onto the medium, the nozzles being arranged in the prescribed direction, and the third nozzle row being configured to form a third band image while facing a third location on the medium; and a storage portion configured to store a dither mask used in a halftoning process for converting input data including a plurality of arranged pixels into dot data representing dot on/off states, the dither mask having a plurality of arranged threshold values, the fluid ejection method comprising:

in order to form an image in which an edge portion lying to one side in the prescribed direction in the first band image overlaps an edge portion lying to the other side in the prescribed direction in the second band image, and an edge portion lying to one side in the prescribed direction in the second band image overlaps an edge portion lying to the other side in the prescribed direction in the third band image, associating the dither mask stored in the storage portion with the input data for forming the second band image, and carrying out the halftoning process with the dither mask having edge areas that are areas at both edge portions in the prescribed direction and a center area that is an area at a center portion in the prescribed direction, a number of the threshold values arranged in the prescribed direction being equal to a number of the pixels arranged in the prescribed direction in the input data for forming the second band image, and a dot generation rate in the edge areas being lower than a dot generation rate in the center area;

associating the center area and the edge area lying to the one side in the prescribed direction in the dither mask with the input data for forming the center portion and the edge portion lying to the one side in the prescribed direction in the first band image to carry out the halftoning process;

associating the center area in the dither mask with the input data for forming the edge portion lying to the other side in the prescribed direction in the first band image to carry out the halftoning process; and ejecting fluid from the nozzles based on the dot data acquired through the halftoning process.

7. A fluid ejection device comprising:

a first nozzle row having nozzles configured and arranged to eject a fluid onto a medium with the nozzles being arranged in a prescribed direction, the first nozzle row being configured to form a first band image while facing a first location on the medium;

a second nozzle row having nozzles configured and arranged to eject a fluid onto the medium with the nozzles being arranged in the prescribed direction, the second nozzle row being configured to form a second band image while facing a second location on the medium;

a third nozzle row having nozzles configured and arranged to ejecting a fluid onto the medium, the nozzles being arranged in the prescribed direction, and the third nozzle row being configured to form a third band image while facing a third location on the medium;

a storage portion configured to store a dither mask used in a halftoning process for converting input data composed of a plurality of arranged pixels into dot data representing dot on/off states, the dither mask having edge areas that are areas at both edge portions in the prescribed direction and a center area that is an area at a center portion in the prescribed direction, and having a plurality of arranged threshold values; and a control portion configured to form, based on the dot data, an image in which an edge portion lying to one side in the prescribed direction in the first band image overlaps an edge portion lying to the other side in the prescribed direction in the second band image, and an edge portion lying to one side in the prescribed direction in the second band image overlaps an edge portion lying to the other side in the prescribed direction in the third band image, associate the dither mask stored in the storage portion with the input data, and carry out the halftoning process with the dither mask in which a number of the threshold values arranged in the prescribed direction is equal to a number of the pixels arranged in the prescribed direction in the input data for forming the second band image, and a dot generation rate in the edge areas is lower than a dot generation rate in the center area; and when the edge portion lying to the other side in the prescribed direction in the first band image is to be formed, establish the nozzles of the edge portion lying to the other side in the first nozzle row as disabled nozzles that are not to be used in image formation.

8. The fluid ejection device according to claim 7, wherein when the edge portion lying to the one side in the prescribed direction in the third band image is to be formed, the control portion sets the nozzles of the edge portion lying to the one side in the third nozzle row as disabled nozzles that are not to be used in image formation.

9. A non-transitory computer readable medium having stored thereon a program which is executable by a computer to cause the computer to create data for an image to be formed by a fluid ejection device, the fluid ejection device having: a first nozzle row having nozzles configured and arranged to eject a fluid onto a medium with the nozzles being arranged in a prescribed direction, the first nozzle row being configured to form a first band image while facing a first location on the medium; a second nozzle row having nozzles configured and arranged to eject a fluid onto the medium with the nozzles being arranged in the prescribed direction, the second nozzle row being configured to form a second band image while facing a second location on the medium; a third nozzle row having nozzles configured and arranged to ejecting a fluid onto the medium, the nozzles being arranged in the prescribed direction, and the third nozzle row being configured to form a third band image while facing a third location on the medium, when a halftoning process for converting input data made of a plurality of arranged pixels into dot data representing dot on/off states is performed for the purpose of forming an image in which an edge portion lying to one side in the prescribed direction in the first band image overlaps an edge portion lying to the other side in the prescribed direction in the second band image, and an edge portion lying to one side in the prescribed direction in the second band image overlaps an edge portion lying to the other side in the prescribed direction in the third band image, the program controls the computer to execute function of:

associating a dither mask with the input data, and carrying out the halftoning process with the dither mask having edge areas that are areas at both edge portions in the prescribed direction and a center area that is an area at a center portion in the prescribed direction, and having a plurality of arranged threshold values, a number of the threshold values arranged in the prescribed direction being equal to a number of the pixels arranged in the prescribed direction in the input data for forming the second band image, and a dot generation rate in the edge areas being lower than a dot generation rate in the center area; and when the edge portion lying to the other side in the prescribed direction in the first band image is formed, establishing the nozzles of the edge portion lying to the other side in the first nozzle row as disabled nozzles that are not to be used in image formation.

10. A fluid ejection method for a fluid ejection device having: a first nozzle row having nozzles configured and arranged to eject a fluid onto a medium with the nozzles being arranged in a prescribed direction, the first nozzle row being configured to form a first band image while facing a first location on the medium; a second nozzle row having nozzles configured and arranged to eject a fluid onto the medium with the nozzles being arranged in the prescribed direction, the second nozzle row being configured to form a second band image while facing a second location on the medium; a third nozzle row having nozzles configured and arranged to ejecting a fluid onto the medium, the nozzles being arranged in the prescribed direction, and the third nozzle row being configured to form a third band image while facing a third location on the medium; and a storage portion configured to store a dither mask used in a halftoning process for converting input data including a plurality of arranged pixels into dot data representing dot on/off states, the dither mask having a plurality of arranged threshold values, the fluid ejection method comprising:

in order to form an image in which an edge portion lying to one side in the prescribed direction in the first band image overlaps an edge portion lying to the other side in the prescribed direction in the second band image, and an edge portion lying to one side in the prescribed direction in the second band image overlaps an edge portion lying to the other side in the prescribed direction in the third band image, associating the dither mask stored in the storage portion with the input data, and carrying out the halftoning process with the dither mask having edge areas that are areas at both edge portions in the prescribed direction and a center area that is an area at a center portion in the prescribed direction, a number of the threshold values arranged in the prescribed direction being equal to a number of the pixels arranged in the prescribed direction in the input data for forming the second band image, and a dot generation rate in the edge areas being lower than a dot generation rate in the center area;

during formation of the edge portion lying to the other side in the prescribed direction in the first band image, establishing the nozzles of the edge portion lying to the other side in the first nozzle row as disabled nozzles that are not to be used in image formation; and ejecting fluid from the nozzles based on the dot data acquired through the halftoning process.

* * * * *